US010711078B2

(12) United States Patent
Ogawa et al.

(10) Patent No.: US 10,711,078 B2
(45) Date of Patent: Jul. 14, 2020

(54) POLYMERIZABLE COMPOSITION, PROCESS FOR PRODUCING ORGANIC GLASS USING THE COMPOSITION, AND ORGANIC GLASS

(71) Applicant: MITSUI CHEMICALS, INC., Minato-ku, Tokyo (JP)

(72) Inventors: Tatsuya Ogawa, Omuta (JP); Andrea Vecchione, Rimini (IT); Roberto Forestieri, Ravenna (IT); Fiorenzo Renzi, Ravenna (IT); Willem Bos, Arnhem (NL)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 345 days.

(21) Appl. No.: 15/759,534

(22) PCT Filed: Sep. 16, 2016

(86) PCT No.: PCT/JP2016/077420
§ 371 (c)(1),
(2) Date: Mar. 13, 2018

(87) PCT Pub. No.: WO2017/047743
PCT Pub. Date: Mar. 23, 2017

(65) Prior Publication Data
US 2019/0153131 A1    May 23, 2019

(30) Foreign Application Priority Data
Sep. 16, 2015 (JP) ................... 2015-183493
Dec. 9, 2015 (JP) ................... 2015-240356

(51) Int. Cl.
C08F 18/24 (2006.01)
G02C 7/10 (2006.01)
G02B 1/04 (2006.01)
C08F 2/44 (2006.01)
C08F 218/16 (2006.01)
C08K 5/1545 (2006.01)
C08K 5/357 (2006.01)
B29D 11/00 (2006.01)
B29K 69/00 (2006.01)

(52) U.S. Cl.
CPC ............... *C08F 18/24* (2013.01); *C08F 2/44* (2013.01); *C08F 218/16* (2013.01); *C08K 5/1545* (2013.01); *C08K 5/357* (2013.01); *G02B 1/04* (2013.01); *G02B 1/041* (2013.01); *G02C 7/10* (2013.01); *B29D 11/00009* (2013.01); *B29K 2069/00* (2013.01); *G02C 7/102* (2013.01)

(58) Field of Classification Search
CPC .......... C08F 18/24; C08F 2/44; C08F 218/16; C08K 5/1545; C08K 5/357; G02B 1/04; G02B 1/041; G02C 7/10; G02C 7/102; B29D 11/00009; B29K 2069/00

USPC ........................................................ 428/500
See application file for complete search history.

(56) References Cited

U.S. PATENT DOCUMENTS

| | | |
|---|---|---|
| 4,613,656 A | 9/1986 | Tang |
| 5,395,566 A | 3/1995 | Kobayakawa et al. |
| 5,462,698 A | 10/1995 | Kobayakawa et al. |
| 5,599,876 A | 2/1997 | Renzi et al. |
| 5,708,064 A | 1/1998 | Coleman et al. |
| 5,739,243 A | 4/1998 | Herold et al. |
| 5,776,376 A | 7/1998 | Nagoh et al. |
| 5,973,093 A | 10/1999 | Daughenbaugh et al. |
| 6,316,570 B1 | 11/2001 | Bonde et al. |
| 6,572,794 B1 | 6/2003 | Berzon et al. |
| 6,669,873 B1 | 12/2003 | Smith et al. |
| 7,214,754 B2 | 5/2007 | Nagpal |
| 7,247,262 B2 | 7/2007 | Evans et al. |
| 7,556,750 B2 | 7/2009 | Xiao et al. |
| 7,807,075 B2 | 10/2010 | Evans et al. |
| 8,277,700 B2 | 10/2012 | Zhang et al. |
| 8,865,029 B2 | 10/2014 | Evans et al. |
| 9,217,812 B2 | 12/2015 | Evans et al. |
| 9,250,356 B2 | 2/2016 | Evans et al. |
| 2003/0173551 A1 | 9/2003 | Nagpal |
| 2005/0269556 A1 | 12/2005 | Evans et al. |
| 2006/0226400 A1 | 10/2006 | Xiao et al. |
| 2008/0006798 A1 | 1/2008 | Evans et al. |

(Continued)

FOREIGN PATENT DOCUMENTS

| | | |
|---|---|---|
| EP | 0540003 A1 | 5/1993 |
| EP | 0595424 A2 | 5/1994 |

(Continued)

OTHER PUBLICATIONS

International Search Report (PCT/ISA/210) dated Dec. 13, 2016, by the Japanese Patent Office as the International Searching Authority for International Application No. PCT/JP2016/077420.
Written Opinion (PCT/ISA/237) dated Dec. 13, 2016, by the Japanese Patent Office as the International Searching Authority for International Application No. PCT/JP2016/077420.
Extended Search Report issued by the European Patent Office in corresponding European Patent Application No. 16846614.2-1107 dated Apr. 24, 2019 (6 pages).

(Continued)

Primary Examiner — William K Cheung

(57) ABSTRACT

A polymerizable composition according to the present invention includes a compound (A) including two or more allyloxycarbonyl groups represented by Formula (1); at least one kind of polymerization initiator (B) selected from the group consisting of a peroxyketal-based radical polymerization initiator, a peroxy monocarbonate-based radical polymerization initiator, and a peroxyester-based radical polymerization initiator; and at least one kind of photochromic compound (C) selected from a naphthopyran compound group.

16 Claims, No Drawings

(56) References Cited

U.S. PATENT DOCUMENTS

| | | | |
|---|---|---|---|
| 2011/0143141 A1* | 6/2011 | He | C07D 311/94 428/412 |
| 2011/0147681 A1 | 6/2011 | Evans et al. | |
| 2011/0190455 A1 | 8/2011 | Partington | |
| 2011/0260125 A1 | 10/2011 | Zhang et al. | |
| 2012/0085980 A2 | 4/2012 | Zhang et al. | |
| 2014/0027684 A1 | 1/2014 | Evans et al. | |
| 2014/0042377 A1 | 2/2014 | Evans et al. | |

FOREIGN PATENT DOCUMENTS

| | | |
|---|---|---|
| JP | H05-306392 A | 11/1993 |
| JP | H07-002938 A | 1/1995 |
| JP | H08-320534 A | 12/1996 |
| JP | 2003-503514 A | 1/2003 |
| JP | 2004-504474 A | 2/2004 |
| JP | 2004-078052 A | 3/2004 |
| JP | 2004-511578 A | 4/2004 |
| JP | 2006-505684 A | 2/2006 |
| JP | 2006-509097 A | 3/2006 |
| JP | 2008-537746 A | 9/2008 |
| JP | 2009-019157 A | 1/2009 |
| JP | 2012-511091 A | 5/2012 |
| WO | WO 95/10790 A1 | 4/1995 |
| WO | 00/78832 A1 | 12/2000 |
| WO | 01/25301 A1 | 4/2001 |
| WO | 2004/041961 A1 | 5/2004 |
| WO | WO 2009/146509 A1 | 12/2009 |
| WO | WO 2010/020770 A1 | 2/2010 |
| WO | WO 2012/149599 A1 | 11/2012 |
| WO | WO 2012/162725 A1 | 12/2012 |

OTHER PUBLICATIONS

Examination Report dated Dec. 10, 2019 by the Indian Patent Office in corresponding Indian Patent Application No. 201817008959. (6 pages).

* cited by examiner

POLYMERIZABLE COMPOSITION, PROCESS FOR PRODUCING ORGANIC GLASS USING THE COMPOSITION, AND ORGANIC GLASS

This application is a U.S. National Stage Application under 35 U.S.C. § 371 of PCT International Application No. PCT/JP2016/077420, filed Sep. 16, 2016, which claims the benefit of Japanese Patent Application No. 2015-183493 filed on Sep. 16, 2015 and Japanese Patent Application No. 2015-240356 filed on Dec. 9, 2015 with the Japan Patent Office, the entire disclosures of which are incorporated herein by reference.

TECHNICAL FIELD

The present invention relates to a polymerizable composition which can be suitably used for producing a photochromic cured product having excellent photochromic action.

BACKGROUND ART

Photochromism is a reversible action in which in a case where a certain compound is irradiated with light containing ultraviolet rays such as sunlight or mercury lamp light, a color thereof quickly changes, and in a case where irradiation with light is stopped and the compound is put in a dark place, the color returns to the original color, and photochromism is applied in various uses.

For example, photochromism is applied also in a field of a spectacle lens, plastic lenses having photochromic properties can be obtained by curing polymerizable monomers to which various photochromic compounds having the above properties are added. As photochromic compounds, a fulgimide compound, a spirooxazine compound, a chromene compound, and the like which can be suitably used for such uses have been found.

Photochromic spectacles are spectacles which are quickly colored in the outdoors with irradiation of light including ultraviolet rays such as sunlight to function as sunglasses and which fade in the indoors without such light irradiation to function as transparent ordinary spectacles, and demands thereof have recently increased.

With respect to the photochromic spectacle lens, a lens made of plastic is particularly preferred in view of light weight and safety, and the photochromic properties are provided to such a plastic lens generally by combining with an organic photochromic compound. As the combination method, a method of impregnating the surface of a lens not containing photochromic properties with a photochromic compound (hereinafter referred to as an impregnation method) and a method of directly obtaining a photochromic lens by dissolving a photochromic compound in a monomer and performing polymerization thereon (hereinafter referred to as a mixing method) are known. Various techniques have been proposed for impregnation methods (see Patent Documents 1 to 3) and mixing methods (see Patent Documents 4 and 5).

RELATED DOCUMENT

Patent Document

[Patent Document 1] U.S. Pat. No. 5,739,243
[Patent Document 2] U.S. Pat. No. 5,973,093
[Patent Document 3] Pamphlet of International Publication WO95/10790
[Patent Document 4] Japanese Unexamined Patent Publication No. H5-306392
[Patent Document 5] Japanese Unexamined Patent Publication No. H8-320534
[Patent Document 6] Japanese Unexamined Patent Publication No. H7-2938
[Patent Document 7] Japanese Unexamined Patent Publication No. 2009-19157
[Patent Document 8] Japanese Unexamined Patent Publication No. 2004-78052
[Patent Document 9] Pamphlet of International Publication WO2009/146509
[Patent Document 10] Pamphlet of International Publication WO2010/20770
[Patent Document 11] Pamphlet of International Publication WO2012/149599
[Patent Document 12] Pamphlet of International Publication WO2012/162725

SUMMARY OF THE INVENTION

Technical Problem

These photochromic compounds and plastic lenses including these compounds and having photochromic properties generally exhibit excellent photochromic characteristics. However, in order to use these photochromic complexes for various applications, particularly, for photochromic spectacle lenses, it is required not only to exhibit a satisfactory photochromic action, but also to be manufacturable simply and at a low cost and to have excellent mechanical or optical characteristics as a photochromic spectacle lens.

In a case where photochromic plastic exemplified as the impregnation method above is used for spectacle application, since a substrate is separately formed and the obtained substrate is impregnated with the photochromic compound, the process thereof is complicated, and in order to improve impregnating performances, the glass transition temperature (Tg) of the substrate needs to be lowered. Therefore, flexibility of the substrate becomes too high. As a result, the hardness of the substrate decreases, heat resistance decreases, and thus new problems such as many optical distortions are caused.

Patent Documents 4 and 5 exemplified above as describing mixing methods have room for further improvements in that these techniques require special equipment in view of moldability, since their use of a highly reactive di(meth) acrylate-based radical polymerizable monomer makes polymerization difficult to control, such that photochromic spectacle lenses without distortion can be produced only by using a polymerization oven capable of strictly controlling the temperatures to equal to or lower than 35° C., and in that their use of a special acrylate-based material prevents low-cost production of the lenses.

A process for producing a photochromic spectacle lens by the mixing method, by using diethylene glycol bisallyl carbonate (hereinafter, abbreviated as 'CR-39' which is commonly known in some cases) with which a cured product having a refractive index of 1.50 which is used as a general-purpose material of a spectacle lens can be obtained as a radical polymerizable monomer, has been attempted in various ways. However, since the monomer has low reactivity, in a case where diisopropyl peroxydicarbonate (hereinafter, abbreviated as 'IPP' which is commonly known in some cases) having high oxidation action is polymerized in coexistence with a photochromic compound, IPP oxidizes the photochromic compound, and thus there is a problem in that a photochromic spectacle lens exhibiting sufficient photochromic characteristics has not been obtained.

Solution to Problem

The present inventors have diligently conducted research on a polymerizable composition with which a photochromic cured product represented by photochromic spectacle lens can be manufactured simply and at a low cost by the mixing method, by mixing and polymerizing a specific photochromic compound and a polymerizable monomer. As a result, the present inventors have found that, in the application of the spectacle lens, it is possible to manufacture a photochromic cured product by using a photochromic polymerizable composition including diethylene glycol bisallyl carbonate and/or an oligomer thereof which have been used as a general-purpose material at a low cost in a low-refractive-index market, diallyl phthalate and/or an oligomer thereof which have been used as a general-purpose material at a low cost in a medium-refractive-index market, a specific photochromic dye, and also a radical polymerization initiator, with a facility that does not require strict temperature control in a good yield, and the photochromic characteristics of the obtained photochromic cured product are superior to the products in the related art, so as to complete the present invention.

The present invention can be provided below.

[1] A polymerizable composition comprising: a compound (A) including two or more allyloxycarbonyl groups represented by Formula (1);

a polymerization initiator (B) which is at least one kind selected from the group consisting of a peroxyketal-based radical polymerization initiator, a peroxy monocarbonate-based radical polymerization initiator, and a peroxyester-based radical polymerization initiator; and a photochromic compound (C) which is at least one kind selected from a naphthopyran compound group,

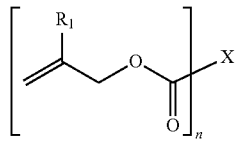
(1)

wherein, in the formula, n is an integer of 2 to 6, $R_1$ represents a hydrogen atom or a methyl group, and a plurality of $R_1$'s existing together may be identical to or different from each other, and X is a divalent to hexavalent organic group a derived from a linear or branched aliphatic polyol having 3 to 12 carbon atoms which optionally have an oxygen atom, a divalent to hexavalent organic group b derived from a cyclic aliphatic polyol having 5 to 16 carbon atoms which optionally have an oxygen atom, or a divalent to hexavalent organic group c derived from an aromatic compound having 6 to 12 carbon atoms, and the organic group a or the organic group b is bonded to an allyloxycarbonyl group via an ether group derived from a hydroxyl group included in these organic groups, so as to form an allyl carbonate group.

[2] The polymerizable composition according to [1], in which, the compound (A) including two or more allyloxycarbonyl groups includes an allyl carbonate polymerizable compound represented by Formula (2) and an oligomer thereof, an allyl ester polymerizable compound represented by Formula (3) or (4) and an oligomer thereof, or a polymerizable compound including at least one of an allyl ester group and an allyl carbonate group represented by Formula (5) and an oligomer thereof,

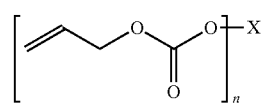
(2)

wherein, in Formula (2), X represents a divalent to hexavalent group derived from a linear or branched C3 to C12 aliphatic polyol or a divalent to hexavalent group derived from a C5 to C16 cyclic aliphatic polyol, and n represents an integer of 2 to 6,

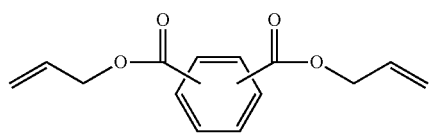
(3)

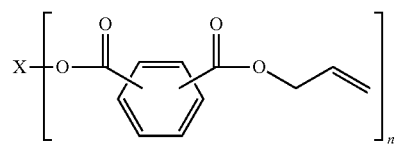
(4)

wherein, in Formula (4), X represents a divalent group derived from a linear or branched C2 to C8 aliphatic diol or a trivalent to hexavalent group derived from a linear or branched C3 to C10 aliphatic polyol having three to six hydroxyl groups, and n represents an integer of 2 to 6,

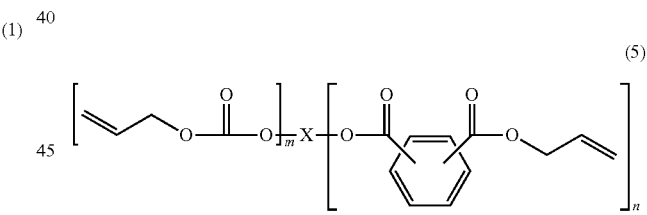
(5)

wherein, in Formula (5), X represents a divalent group derived from a linear or branched C2 to C8 aliphatic diol or a trivalent to hexavalent group derived from a linear or branched C3 to C10 aliphatic polyol having three to six hydroxyl groups, m and n each represent an integer of 0 to 6, and a sum of m and n is an integer of 2 to 6.

[3] The polymerizable composition according to [1] or [2], in which the polymerization initiator (B) is at least one kind selected from the group consisting of a peroxyketal-based polymerization initiator represented by Formula (6) having a 10-hour half-life temperature of 80° C. or more, a peroxy monocarbonate-based polymerization initiator represented by Formula (7) having a 10-hour half-life temperature of 80° C. or more, and a peroxyester-based polymerization initiator represented by Formula (8) having a 10-hour half-life temperature of 65° C. or more,

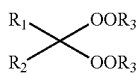
(6)

wherein, in Formula (6), $R_3$ is a tertiary alkyl group, $R_1$ and $R_2$ each independently represent an alkyl group selected from methyl, ethyl, propyl, and butyl, the alkyl group may have an alkyl ester group at a terminal thereof, or $R_1$ and $R_2$ may form a cycloalkylene group together with a carbon atom to which $R_1$ and $R_2$ are bonded, and the cycloalkylene group may have one to three alkyl substituents,

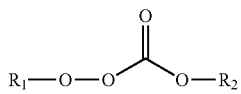
(7)

wherein, in Formula (7), $R_1$ represents a C3 to C6 tertiary alkyl group, and $R_2$ represents a linear or branched C3 to C8 alkyl group,

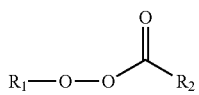
(8)

wherein, in Formula (8), $R_1$ represents a C3 to C6 tertiary alkyl group, and $R_2$ represents a linear or branched C3 to C9 alkyl group or a phenyl group.

[4] The polymerizable composition according to any one of [1] to [3], in which the photochromic compound (C) is at least one kind selected from Formula (9) or (10),

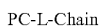

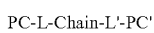

wherein, in Formula (9) or (10), PC and PC' each represent a monovalent group derived from compounds of Formulae (11) to (14), and PC and PC' may be identical to or different from each other, (11)

(12)

(13)

(14)

wherein, in Formulae (11) to (14), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom or a nitrogen atom, any one group included in the compounds represented by Formulae (11) to (14) is bonded to L or L' which is a divalent organic group), in Formula (9) or (10), L and L' each represent a divalent organic group including at least one kind selected from an oxyethylene chain, an oxypropylene chain, a (thio) ester group, and a (thio)amide group, and in Formula (9) or (10), Chain represents a monovalent or divalent organic group including at least one kind selected from a polysiloxane chain and a polyoxyalkylene chain.

[5] The composition according to [2], in which the allyl carbonate polymerizable compound includes at least one kind selected from:

a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane;

a tris(allyl carbonate) compound of at least one kind of triol selected from glycerol, trimethylolpropane, and tris (hydroxyethyl) isocyanurate;

a tetra(allyl carbonate) compound of at least one kind of tetraol selected from pentaerythritol, diglycerol, and ditrimethylolpropane;

a hexa(allyl carbonate) compound of dipentaerythritol; and a mixed poly(allyl carbonate) compound of at least two kinds selected from the diol compound, the triol compound, the tetraol compound, and the dipentaerythritol compound.

[6] The composition according to [2], in which the allyl carbonate polymerizable compound includes at least one kind selected from:

(i) a mixture of a diethylene glycol bis(allyl carbonate) and an oligomer thereof;

(ii) a mixture of a bis(allyl carbonate) compound of a mixture of diethylene glycol and neopentyl glycol and an oligomer thereof;

(iii) a mixture of a poly(allyl carbonate) compound of a mixture of diethylene glycol and tris(hydroxyethyl) isocyanurate and an oligomer thereof;

(iv) a mixture of a poly(allyl carbonate) compound of a mixture of diethylene glycol and trimethylolpropane and an oligomer thereof;

(v) a mixture of a poly(allyl carbonate) compound of a mixture of diethylene glycol and pentaerythritol and an oligomer thereof;

(vi) a mixture of a poly(allyl carbonate) compound of a mixture of diethylene glycol, neopentyl glycol, and pentaerythritol and an oligomer thereof; and (vii) a poly(allyl carbonate) mixture including a mixture of a poly(allyl carbonate) compound of a mixture of diethylene glycol, neopentyl glycol, and pentaerythritol and an oligomer thereof and a mixture of a diethylene glycol bis(allyl carbonate) compound and an oligomer thereof.

[7] The composition according to [2], in which the allyl ester polymerizable compound includes at least one kind selected from:

a diallyl phthalate monomer selected from diallyl isophthalate, diallyl terephthalate, and diallyl orthophthalate;

a diallyl ester monomer obtained by transesterification reaction of the diallyl phthalate monomer and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof;

a polyallyl ester monomer obtained by transesterification reaction of the diallyl phthalate monomer and a mixture of at least one kind of polyol selected from glycerol, trimethylolpropane, tris(hydroxyethyl) isocyanurate, pentaerythritol, diglycerol, ditrimethylolpropane, and dipentaerythritol, and an oligomer thereof; and an allyl ester monomer including an allyl carbonate group obtained by transesterification reaction of at least one kind of dialkyl phthalate selected from dialkyl isophthalate having a C1 to C3 alkyl group, dialkyl terephthalate, and dialkyl orthophthalate, allyl alcohol, diallyl carbonate, and a mixture of the diol or the polyol, and an oligomer thereof.

[8] The polymerizable composition according to [2], in which the allyl ester polymerizable compound includes at least one kind selected from:

(i) a mixture of diallyl terephthalate, and 30 wt % of a diethylene glycol bis(allyl carbonate) compound and an oligomer thereof with respect to the diallyl terephthalate;

(ii) an allyl ester compound obtained by transesterification reaction of a mixture of diallyl terephthalate and propylene glycol;

(iii) a mixture of the allyl ester compound of (ii), and 20 wt % of a diethylene glycol bis(allyl carbonate) compound and an oligomer thereof with respect to the allyl ester compound;

(iv) a mixture of an allyl ester compound, an allyl carbonate compound, and a compound having an allyl ester group, and an allyl carbonate group, obtained by transesterification reaction of a mixture of dimethyl terephthalate, allyl alcohol, diallyl carbonate, and diethylene glycol; and (v) a mixture of the mixture obtained in (iv), 10 wt % of a diethylene glycol bis(allyl carbonate) compound and the oligomer thereof with respect to the mixture.

[9] The polymerizable composition according to [2], in which the compound (A) including two or more allyloxycarbonyl groups is a mixture of the allyl ester polymerizable compound according to [7] and an oligomer thereof and the allyl carbonate polymerizable compound according to [5] and an oligomer thereof.

[10] The composition according to any one of [1] to [9], in which a content of the component (B) is 0.3 to 5.0 pbw with respect to 100 pbw of the component (A).

[11] The composition according to any one of [1] to [9], in which a content of the component (C) is 0.01 to 0.5 pbw with respect to 100 pbw of the component (A).

[12] A process for producing an organic glass having a photochromic performance, the process including: a step of performing radical polymerization on the polymerizable composition according to any one of [1] to [11].

[13] The process according to [12], in which the step includes a cast polymerization step of injecting the polymerizable composition according to any one of [1] to [11] into a casting mold and polymerizing the polymerizable composition at a temperature in a range of 50° C. to 120° C. for 1 to 100 hours.

[14] An organic glass obtained by polymerizing and curing the polymerizable composition according to any one of [1] to [11].

[15] A lens comprised of the organic glass according to [14].

[16] A polarized lens comprising: a polarizing film; and a substrate layer comprised of the organic glass according to [14] formed on at least one surface of the polarizing film.

According to the present invention, for example, a "bis (allyl carbonate) compound of diol" means a compound having a structure in which two hydroxyl groups of diol are substituted with allyl carbonate groups.

According to the present invention, for example, a "bis (allyl carbonate) compound of a mixture of diethylene glycol and neopentyl glycol" means (1) a compound having a structure in which two hydroxyl groups of diethylene glycol are substituted with allyl carbonate groups, and (2) a compound having a structure in which two hydroxyl groups of neopentyl glycol are substituted with allyl carbonate groups.

According to the present invention, for example, an "oligomer of bis(allyl carbonate) compound of a mixture of diethylene glycol and neopentyl glycol" means an oligomer of the compound (1), an oligomer of the compound (2), and an oligomer of the compound (1) and the compound (2).

Advantageous Effects of Invention

A cured product obtained by polymerizing the polymerizable composition according to the present invention not only has excellent photochromic characteristics, but also has excellent moldability, is manufacturable in facilities that does not require strict temperature control in a good yield, and has excellent mechanical properties and excellent optical properties such as hue. A cured product obtained by polymerizing the photochromic polymerizable composition according to the present invention is useful as an organic glass having photochromic properties and, for example, can be suitably used in an application such as a photochromic spectacle lens.

DESCRIPTION OF EMBODIMENTS

A polymerizable composition according to the present invention includes a compound (A) including two or more allyloxycarbonyl groups; a polymerization initiator (B) which is at least one kind selected from the group consisting of a peroxyketal-based radical polymerization initiator, a peroxy monocarbonate-based radical polymerization initiator, and a peroxyester-based radical polymerization initiator; and a photochromic compound (C) which is at least one kind selected from a naphthopyran compound group.

[Compound (A) Including Two or More Allyloxycarbonyl Groups]

According to the present invention, the compound (A) including two or more allyloxycarbonyl groups can be represented by the following formula.

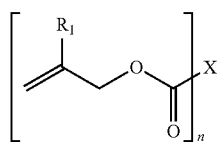

(1)

In the formula, n is an integer of 2 to 6. $R_1$ represents a hydrogen atom or a methyl group, and a plurality of $R_1$'s existing together may be identical to or different from each other.

X is a divalent to hexavalent organic group a derived from a linear or branched aliphatic polyol a1 having 3 to 12 carbon atoms which optionally have an oxygen atom, a divalent to hexavalent organic group b derived from a cyclic aliphatic polyol b1 having 5 to 16 carbon atoms that may have an oxygen atom, or a divalent to hexavalent organic group c derived from an aromatic compound c1 having 6 to 12 carbon atoms, and the organic group a or the organic group b is bonded to an allyloxycarbonyl group via an ether group derived from a hydroxyl group, so as to form an allyl carbonate group.

The polyol may usually include 2 to 6 hydroxyl groups and preferably include 2 to 4 hydroxyl groups in a molecule.

Examples of the aliphatic polyol a1 include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, glycerol, trimethylolpropane, tris(hydroxyethyl) isocyanurate, pentaerythritol, and dipentaerythritol.

Examples of cyclic aliphatic polyol b1 include 1,4-dimethylolcyclohexane and 4,8-bis(hydroxymethyl)-[$5.2.1.0^{2+6}$] tricyclodecane.

Examples of the aromatic compound c1 include benzene, toluene, xylene, and naphthalene.

Specific examples of the compound (A) including two or more allyloxycarbonyl groups include an allyl carbonate polymerizable compound, an allyl ester polymerizable compound, and a polymerizable compound including at least one of an allyl carbonate group and an allyl ester group.

The compound including two or more allyloxycarbonyl groups may include an oligomer thereof. The compound including two or more allyloxycarbonyl groups is a liquid at room temperature, the viscosity measured at 25° C. is 10 to 1,000 cSt, and an oligomer content thereof may vary in a wide range, for example, 0 to about 80 wt %.

(Allyl Carbonate Polymerizable Compound)

The allyl carbonate polymerizable compound can be represented by Formula (2) and may include an oligomer thereof. The oligomer is poly(allyl carbonate) in which two or more molecules of polyol are linked through a carbonate group produced by transesterification reaction of allyl carbonate produced in the producing step and polyol.

The allyl carbonate polymerizable compound is a poly(allyl carbonate) compound of a linear or branched aliphatic polyol having 3 to 12 carbon atoms. The poly(allyl carbonate) compound of a cyclic aliphatic polyol having 5 to 16 carbon atoms in a molecule is suitable for this object. The polyol may usually have 2 to 6 hydroxyl groups and preferably include 2 to 4 hydroxyl groups in a molecule. A mixed poly(allyl carbonate) compound, that is, a compound which can be obtained by mechanically mixing poly(allyl carbonate) compounds of each of two or more kinds of polyols can be used or a compound which can be directly obtained by chemical reaction of a mixture of the polyols and diallyl carbonate can be also used. Finally, all of these poly(allyl carbonate) compounds can be in the form of a mixture of monomers or monomers and oligomers. Generally, the allyl carbonate polymerizable compound is a product which is a liquid at room temperature, the viscosity measured at 25° C. is 10 to 1,000 cSt, and an oligomer content thereof may vary in a wide range, for example, 0 to about 80 wt %.

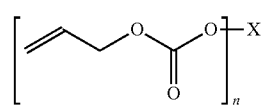

(2)

In Formula (2), X represents a divalent to hexavalent group derived from a linear or branched C3 to C12 aliphatic polyol or a divalent to hexavalent group derived from a C5 to C16 cyclic aliphatic polyol, and n represents an integer of 2 to 6.

Specific examples of the polyol forming X of Formula (2) include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, 4,8-bis(hydroxymethyl)-[5.2.1.0$^{2,6}$]tricyclodecane, glycerol, trimethylolpropane, tris (hydroxyethyl) isocyanurate, pentaerythritol, diglycerol, ditrimethylolpropane, and dipentaerythritol.

Accordingly, the examples of the allyl carbonate compound include at least one kind selected from a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane, a tris(allyl carbonate) compound of at least one kind of triol selected from glycerol, trimethylolpropane, and tris(hydroxyethyl) isocyanurate, a tetra(allyl carbonate) compound of at least one kind of tetraol selected from pentaerythritol, diglycerol, and ditrimethylolpropane, a hexa(allyl carbonate) compound of dipentaerythritol, and a mixed poly(allyl carbonate) compound of at least two kinds selected from the diol compound, the triol compound, the tetraol compound, and the dipentaerythritol compound.

"Bis(allyl carbonate) of a mixture of at least two kinds of diol", for example, can be obtained as a mixture of the following monomer components and the following oligomer components, in a case where diol is diethylene glycol and neopentyl glycol.

Monomer Component
(1) Diethylene glycol bis(allyl carbonate)
(2) Neopentyl glycol bis(allyl carbonate)
Oligomer Component
(3) Oligomer including only hydrocarbon (and ether) derived from diethylene glycol
(4) Oligomer including hydrocarbon derived from neopentyl glycol
(5) Complex oligomer including both of hydrocarbon (and ether) derived from diethylene glycol and hydrocarbon derived from neopentyl glycol in the same molecule The followings are preferable examples of the allyl carbonate polymerizable compound suitable for the object of the present invention.

(i) A mixture of diethylene glycol bis(allyl carbonate) and an oligomer thereof

Diethylene glycol bis(allyl carbonate) can be defined in Formula (I).

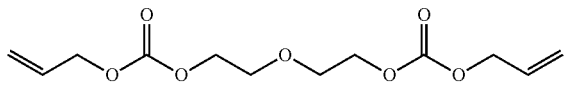

An oligomer of diethylene glycol bis(allyl carbonate) can be defined in Formula (II).

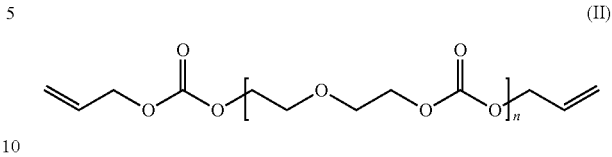

In the formula, n is equal to or greater than 2.

For example, the compound (I) can be manufactured by reacting diethylene glycol bis (chloroformate) with allyl alcohol as described in "Encyclopedia of Chemical Technology", Kirk-Othmer, Third edition, Volume 2, pages 111 to 112. The mixture of diethylene glycol bis(allyl carbonate) (Formula (I)) and an oligomer thereof (Formula (II)) can be simply manufactured, for example, as described in European Patent No. 35,304 by transesterification of diallyl carbonate and diethylene glycol in the presence of a basic catalyst. These mixtures generally include up to about 80 wt % of an oligomer.

(ii) A mixture of a bis(allyl carbonate) compound of a mixture of diethylene glycol and neopentyl glycol and an oligomer thereof The bis(allyl carbonate) compound is the same as the bis(allyl carbonate) of the point (i) above except for replacing diethylene glycol with a mixture of diethylene glycol and neopentyl glycol.

(iii) A mixture of a poly(allyl carbonate) compound of a mixture of diethylene glycol and tris(hydroxyethyl) isocyanurate and an oligomer thereof This poly(allyl carbonate) compound can be obtained by transesterification of diallyl carbonate of a mixture of diethylene glycol and tris(hydroxyethyl) isocyanurate as described in U.S. Pat. No. 4,812,545.

(iv) A mixture of a poly(allyl carbonate) compound of a mixture of diethylene glycol and trimethylolpropane and an oligomer thereof This poly(allyl carbonate) compound is the same as poly(allyl carbonate) of the point (iii) above, except for replacing tris(hydroxyethyl) isocyanurate with trimethylolpropane.

(v) A mixture of a poly(allyl carbonate) compound of a mixture of diethylene glycol and pentaerythritol and an oligomer thereof This poly(allyl carbonate) compound is the same as a poly(allyl carbonate) compound of the point (iii) above, except for replacing tris (hydroxyethyl) isocyanurate with pentaerythritol.

(vi) A mixture of a poly(allyl carbonate) compound of a mixture of diethylene glycol, neopentyl glycol, and pentaerythritol and an oligomer thereof The poly(allyl carbonate) compound is the same as the poly(allyl carbonate) of the point (v) above except for replacing diethylene glycol with two kinds of diol of diethylene glycol and neopentyl glycol.

(vii) A poly(allyl carbonate) mixture including a mixture of a poly(allyl carbonate) compound of a mixture of diethylene glycol, neopentyl glycol, and pentaerythritol and an oligomer thereof and a mixture of a diethylene glycol bis(allyl carbonate) compound and an oligomer thereof.

(Allyl Ester Polymerizable Compound)

The allyl ester polymerizable compound include diallyl phthalate represented by Formula (3); an allyl ester compound represented by Formula (4) which is obtained by transesterification reaction of diallyl phthalate and a mixture of polyol; or a polymerizable compound including at least one of an allyl ester group and an allyl carbonate group represented by Formula (5) and oligomers thereof.

The polymerizable compound represented by Formula (5) includes a mixture of an allyl ester compound, an allyl carbonate compound, and a compound having an allyl ester group and an allyl carbonate group, obtained by transesterification reaction of dialkyl phthalate, allyl alcohol, diallyl carbonate, and a mixture of polyol.

In the present embodiment, the compounds of Formulae (3) to (5) each include a positional isomer.

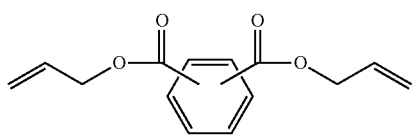
(3)

Diallyl phthalate represented by Formula (3) is at least one kind selected from diallyl isophthalate, diallyl terephthalate, and diallyl orthophthalate.

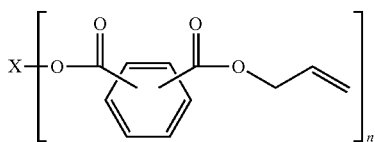
(4)

In Formula (4), X represents a divalent group derived from a linear or branched C2 to C8 aliphatic diol or a trivalent to hexavalent group derived from a linear or branched C3 to C10 aliphatic polyol having three to six hydroxyl groups, and n represents an integer of 2 to 6.

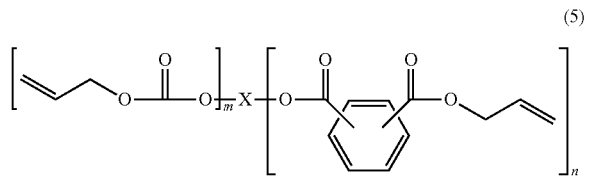
(5)

In Formula (5), X represents a divalent group derived from a linear or branched C2 to C8 aliphatic diol or a trivalent to hexavalent group derived from a linear or branched C3 to C10 aliphatic polyol having three to six hydroxyl groups, m and n each represent an integer of 0 to 6, and a sum of m and n is an integer of 2 to 6.

Specific examples of the diallyl phthalate to be used are diallyl isophthalate, diallyl terephthalate, and diallyl orthophthalate.

The dialkyl phthalate is a phthalic acid diester having C1-C3 alkyl group, and specific examples thereof include dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate.

Specific examples of the polyol constituting X in Formulae (4) and (5) include diol which is ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, or 1,4-dimethylolcyclohexane, triol which is glycerol or trimethylolpropane, and polyol which is tris (hydroxyethyl) isocyanurate, pentaerythritol, diglycerol, ditrimethylolpropane, or dipentaerythritol.

The compound of Formulae (4) and (5) may include an oligomer thereof. The oligomer in Formula (4) is produced by transesterification reaction of an allyl ester compound produced in a manufacturing step and polyol. The oligomer in Formula (5) is produced by transesterification reaction of an allyl ester compound or an allyl carbonate compound produced in the manufacturing step and polyol.

Examples of the allyl ester polymerizable compound include at least one kind selected from a diallyl phthalate monomer selected from diallyl isophthalate, diallyl terephthalate, and diallyl orthophthalate, a diallyl ester monomer obtained by transesterification reaction of the diallyl phthalate monomer and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof, a polyallyl ester monomer obtained by transesterification reaction of the diallyl phthalate and a mixture of at least one kind of polyol selected from glycerol, triol which is trimethylolpropane, tris(hydroxyethyl) isocyanurate, pentaerythritol, diglycerol, ditrimethylolpropane, and dipentaerythritol and an oligomer thereof, and an allyl ester compound, an allyl carbonate compound, a compound having an allyl carbonate group and an allyl ester group, which are obtained by transesterification reaction in a mixture of at least one kind of C1 to C3 dialkyl phthalate selected from dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate, allyl alcohol, diallyl carbonate, and the diol or the polyol, and an oligomer thereof.

Specifically, examples of the allyl ester polymerizable compound preferably include at least one kind selected from:

(i) a mixture of diallyl terephthalate, and 30 wt % of a diethylene glycol bis(allyl carbonate) compound and an oligomer thereof with respect to the diallyl terephthalate;

(ii) an allyl ester compound obtained by transesterification reaction of a mixture of diallyl terephthalate and propylene glycol;

(iii) a mixture of the allyl ester compound of (ii), and 20 wt % of a diethylene glycol bis(allyl carbonate) compound and an oligomer thereof with respect to the allyl ester compound;

(iv) a mixture of an allyl ester compound, an allyl carbonate compound, and a compound having an allyl ester group, and an allyl carbonate group, obtained by transesterification reaction in a mixture of dimethyl terephthalate, allyl alcohol, diallyl carbonate, and diethylene glycol; and (v) a mixture of the mixture obtained in (iv), and 10 wt % of a diethylene glycol bis(allyl carbonate) compound and the oligomer thereof with respect to the mixture.

The followings are preferable examples of the allyl ester polymerizable compound suitable for the object of the present invention.

(i) a mixture of an allyl ester compound, an allyl carbonate compound, and a compound having an allyl ester group, and an allyl carbonate group, obtained by transesterification reaction with a mixture of dimethyl terephthalate, allyl alcohol, diallyl carbonate, and diethylene glycol The allyl ester compounds above can be defined by Formulae (III) to (V), and include diallyl terephthalate (III) as a main component. The allyl ester compounds include an oligomer obtained by transesterification reaction of each of the compounds and polyol.

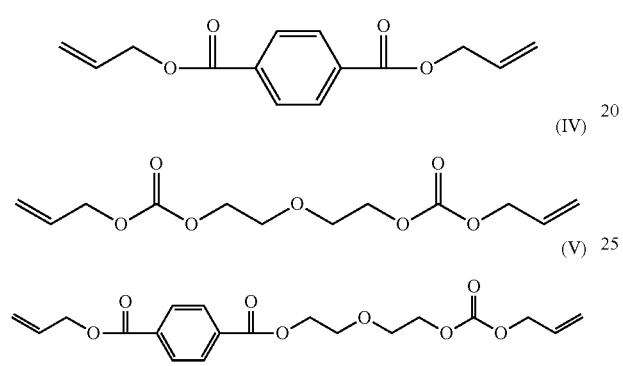

In the present embodiment, in view of the effect of the present invention, the compound (A) including two or more allyloxycarbonyl groups may be a mixture of the allyl ester polymerizable compound and an oligomer thereof, and the allyl carbonate polymerizable compound and an oligomer thereof.

[Radical Polymerization Initiator (B)]

Subsequently, the radical polymerization initiator (B) according to the present invention is described.

As the radical polymerization initiator (B) according to the present invention, a peroxyketal-based radical polymerization initiator (a) represented by Formula (6) having a 10-hour half-life temperature of 80° C. or more, a peroxy monocarbonate-based radical polymerization initiator (b) represented by Formula (7) having a 10-hour half-life temperature of 80° C. or more, and/or a peroxyester-based radical polymerization initiator (c) represented by Formula (8) having a 10-hour half-life temperature of 65° C. or more is used. By using an initiator with a specific decomposition temperature, a photochromic cured product having excellent photochromic characteristics can be obtained without deteriorating the photochromic compound.

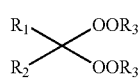

(6)

In Formula (6), $R_3$ is a tertiary alkyl group, $R_1$ and $R_2$ each independently represent an alkyl group selected from methyl, ethyl, propyl, and butyl, the alkyl group may have an incoherent functional group such as an alkyl ester group at a terminal of a chain, or $R_1$ and $R_2$ may form a cycloalkylene group together with a carbon atom to which $R_1$ and $R_2$ are bonded, and the cycloalkylene group may have one to three alkyl substituents.

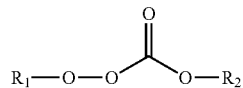

(7)

In Formula (7), $R_1$ represents a C3 to C6 tertiary alkyl group, and $R_2$ represents a linear or branched C3 to C8 alkyl group.

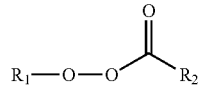

(8)

In Formula (8), $R_1$ represents a C3 to C6 tertiary alkyl group, and $R_2$ represents a linear or branched C3 to C9 alkyl group or a phenyl group.

Specific examples of the peroxyketal-based radical initiator of (a) {denotation in parentheses represents a 10-hour half-life temperature} include
1,1-bis(t-butylperoxy)-3,3,5-trimethylcyclohexane (83° C.),
1,1-bis(t-hexylperoxy)-3,3,5-trimethylcyclohexane (90° C.),
2,2-bis(t-butylperoxy) butane (107° C.),
n-butyl-4,4-bis(t-butylperoxy) valerate (109° C.),
ethyl-3,3-bis(t-butylperoxy) valerate (114° C.),
1,1-bis(t-butylperoxy) cyclohexane (91° C.),
1,1-bis(t-butylperoxy)-2-methylcyclohexane (83° C.),
1,1-bis(t-amylperoxy) cyclohexane (93° C.),
1,1-bis(t-hexylperoxy) cyclohexane (87° C.),
1,1-bis(t-hexylperoxy)-3,3,5-trimethylcyclohexane (87° C.), and
2,2-bis[4,4-(di-t-butylperoxy) cyclohexyl]propane (95° C.)

Specific examples of the peroxy monocarbonate-based radical initiator of (b) {denotation in parentheses represents a 10-hour half-life temperature} include
OO-(t-butyl)-O-isopropyl monoperoxycarbonate (99° C.),
OO-(t-amyl)-O-isopropyl monoperoxycarbonate (96° C.),
OO-(t-butyl)-O-(2-ethylhexyl) monoperoxycarbonate (99° C.), and
OO-(t-amyl)-O-(2-ethylhexyl) monoperoxycarbonate (99° C.).

Specific examples of the peroxyester-based radical initiator of (c) {denotation in parentheses represents a 10-hour half-life temperature} include
t-butylperoxy-2-ethylhexanoate (72° C.),
t-butylperoxyisobutyrate (82° C.),
t-butylperoxy-3,3,5-trimethylhexanoate (97° C.),
t-butyl peroxyacetate (102° C.),
t-butyl peroxy isononate (102° C.),
t-butyl peroxybenzoate (104° C.),
t-amyl peroxy-2-ethylhexanoate (75° C.),
t-amyl peroxy normal octoate (96° C.),
t-amyl peroxyacetate (100° C.),
t-amyl peroxy isononate (96° C.),
t-amyl peroxybenzoate (100° C.),
t-hexylperoxy-2-ethylhexanoate (70° C.),
t-hexyl peroxybenzoate (99° C.), and
1,1,3,3-tetramethylbutylperoxy-2-ethylhexanoate (65° C.)

According to the present invention, the use amount of the radical polymerization initiator varies depending on polymerization conditions, types of initiators, and compositions of the monomers and is not unconditionally limited. However, the use amount thereof is 0.3 to 5.0 pbw or preferably 0.5 to 3.0 pbw with respect to 100 pbw of the compound (A) including the allyloxycarbonyl group, and two or more kinds of radical polymerization initiators may be used in combination.

In polymerizing the polymerizable composition of the present invention, the polymerization conditions, especially temperature, affects the properties of the obtained photochromic cured product. This temperature condition is influenced by the type and amount of the radical polymerization initiator and the kind of monomer, and thus may not be unconditionally limited. However, generally, it is suitable that polymerization is started at a relatively low temperature, the temperature is gradually raised, and curing is performed at a high temperature at the end of polymerization. Since polymerization time varies depending on various factors as well as temperature, it is suitable that the optimum time according to these conditions is preliminarily determined. However, it is preferable that the conditions are selected such that the polymerization is completed in 12 to 24 hours. The polymerizable composition of the present invention does not require strict control at 35° C. or less, curing can be performed even in a pattern starting from 60° C. or more, molding is easy, and thus yield is high.

[Photochromic Compound (C)]

Subsequently, the photochromic compound (C) according to the present invention is described. As the photochromic compound (C), a compound that exhibits a photochromic action may be employed without limitation and at least one kind selected from the naphthopyran compound group may be used.

The photochromic compound according to the present invention is at least one kind selected from Formula (9) or (10).

PC-L-Chain (9)

PC-L-Chain-L'-PC' (10)

PC and PC' represent a monovalent group derived from a compound of Formulae (11) to (14). PC and PC' may be identical to or different from each other.

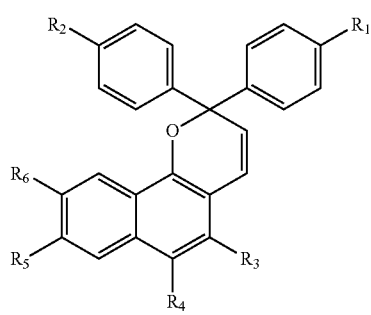
(11)

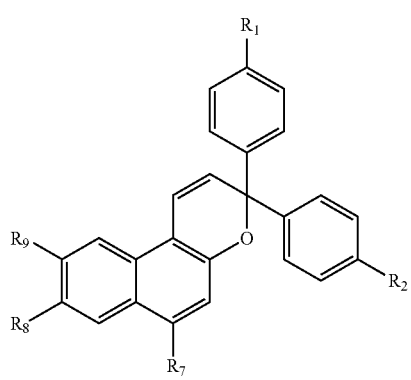
(12)

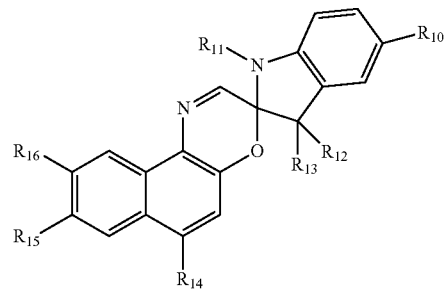
(13)

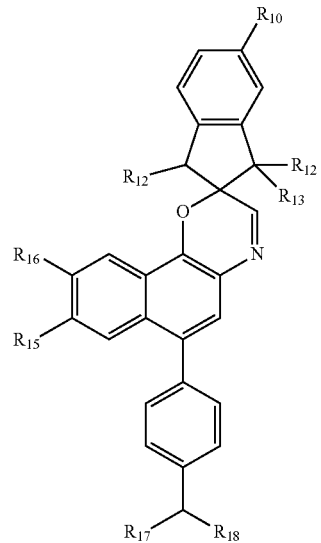
(14)

In Formulae (11) to (14), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other. The aliphatic group, the alicyclic group, or the aromatic organic group may contain an oxygen atom or a nitrogen atom. Any one group included in the compound represented by For- mulae (11) to (14) is bonded to L or L' which is a divalent organic group.

Examples of the optionally substituted C1 to C20 aliphatic group include a linear or branched C1 to C10 alkyl group, a linear or branched C1 to C10 alkoxy group, a linear or branched C2 to C10 alkenyl group, a C1 to C10 hydroxyalkyl group, a C1 to C10 hydroxyalkoxy group, a C1 to C10 alkyl group substituted with a C1 to C10 alkoxy group, a C1 to C10 alkoxy group substituted with a C1 to C10 alkoxy group, a C1 to C5 haloalkyl group, a C1 to C5 dihaloalkyl group, a C1 to C5 trihaloalkyl group, a C1 to C10 alkylamino group, a C1 to C10 aminoalkyl group, and a linear or branched C1 to C20 alkoxycarbonyl group.

Examples of the optionally substituted C3 to C20 alicyclic group include a C3 to C20 cycloalkyl group and a C6 to C20 bicycloalkyl group.

Examples of the optionally substituted C6 to C20 aromatic organic group include a phenyl group, a C7 to C16 alkoxyphenyl group, an arylamino group, a diarylamino group, an aryl C1 to C5 alkylamino group, a cyclic amino group, an arylcarbonyl group, and an aroyl group.

$R_1$ and $R_2$ each preferably include a hydrogen atom; a halogen atom;

an optionally substituted C1 to C20 aliphatic group such as a linear or branched C1 to C10 alkyl group, a linear or branched C1 to C10 alkoxy group, a C1 to C10 hydroxyalkoxy group, a C1 to C10 alkoxy group substituted with a C1 to C10 alkoxy group, a C1 to C5 haloalkyl group, a C1 to C5 dihaloalkyl group, a C1 to C5 trihaloalkyl group, a C1 to C5 alkylamino group; and an optionally substituted C6 to C20 aromatic organic group such as a phenyl group, a C7 to C16 alkoxyphenyl group, a C1 to C5 dialkylamino group, an arylamino group, a diarylamino group, an aryl C1 to C5 alkylamino group, and a cyclic amino group. $R_1$ and $R_2$ may be identical to or different from each other.

Examples of $R_3$ preferably include a hydrogen atom; a halogen atom; a carboxyl group; an acetyl group;

an optionally substituted C1 to C20 aliphatic group such as a linear or branched C1 to C10 alkyl group, a linear or branched C2 to C10 alkenyl group, a linear or branched C1 to C10 alkoxy group, a C1 to C10 hydroxyalkyl group, a C1 to C10 alkyl group substituted with a C1 to C10 alkoxy group, a C1 to C10 aminoalkyl group, and a linear or branched C1 to C20 alkoxycarbonyl group;

an optionally substituted C3 to C20 alicyclic group such as a C3 to C20 cycloalkyl group and a C6 to C20 bicycloalkyl group; and an optionally substituted C6 to C20 aromatic organic group such as an arylcarbonyl group, a formyl group, and an aroyl group.

Examples of $R_4$ preferably include a hydrogen atom; a halogen atom; a carboxyl group; an acetyl group; a formyl group;

an optionally substituted C1 to C20 aliphatic group such as a linear or branched C1 to C10 alkyl group, a linear or branched C2 to C10 alkenyl group, a linear or branched C1 to C10 alkoxy group, a C1 to C10 hydroxyalkyl group, a C1 to C10 alkyl group substituted with a C1 to C10 alkoxy group, a C1 to C10 aminoalkyl group, and a linear or branched C1 to C20 alkoxycarbonyl group;

an optionally substituted C3 to C20 alicyclic group such as a C3 to C20 cycloalkyl group and a C6 to C20 bicycloalkyl group; and an optionally substituted C6 to C20 aromatic organic group such as an arylcarbonyl group, an aroyl group, a phenyl group, a C7 to C16 alkoxyphenyl group, a C1 to C10 dialkoxyphenyl group, a C1 to C10 alkylphenyl group, and a C1 to C10 dialkylphenyl group, $R_3$ and $R_4$ may be bonded to each other. In a case where $R_3$ and $R_4$ are bonded to each other to form a ring structure, examples thereof include Formula (15) or (16). A dotted line portion represents a bond between a carbon atom to which $R_3$ is bonded and a carbon atom to which $R_4$ is bonded.

(15)

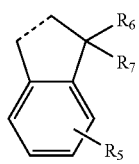

(16)

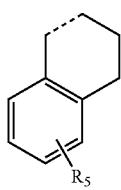

$R_5$, $R_6$, $R_7$, $R_8$, $R_9$, $R_{10}$, $R_{14}$, $R_{15}$, and $R_{16}$ represent functional groups as in $R_1$ and $R_2$. A plurality of $R_5$ to $R_7$ existing together may be identical to or different from each other.

$R_{11}$ preferably includes a hydrogen atom; a halogen atom;

an optionally substituted C1 to C20 aliphatic group such as a linear or branched C1 to C20 alkyl group, a C1 to C5 haloalkyl group, a C1 to C5 dihaloalkyl group, and a C1 to C5 trihaloalkyl group;

an optionally substituted C3 to C20 alicyclic group such as a C3 to C20 cycloalkyl group, a C6 to C20 bicycloalkyl group, a C3 to C20 cycloalkyl group substituted with a C1 to C5 alkyl group, and a C6 to C20 bicycloalkyl group substituted with a C1 to C5 alkyl group; and an optionally substituted C6 to C20 aromatic organic group such as an aryl group which is substituted with a C1 to C5 alkyl group.

$R_{12}$ and $R_{13}$ each preferably include a hydrogen atom; a halogen atom;

an optionally substituted C1 to C20 aliphatic group such as a C1 to C10 alkyl group and a C1 to C5 alkylalkoxycarbonyl group; and an optionally substituted C3 to C20 alicyclic group such as a C5 to C7 cycloalkyl group.

$R_{17}$ and $R_{18}$ each preferably include a hydrogen atom; a halogen atom;

an optionally substituted C1 to C20 aliphatic group such as a linear or branched C1 to C10 alkyl group and a C1 to C10 hydroxyalkyl group; and an optionally substituted C3 to C20 alicyclic group such as a C5 to C7 cycloalkyl group.

In Formula (9) or (10), L and L' each represent a divalent organic group including at least one kind selected from an oxyethylene chain, an oxypropylene chain, a (thio) ester group, and a (thio)amide group.

Specifically, L and L' are represented by Formula (17) to (23). L and L' may be identical to or different from each other.

(17)

(18)

(19)

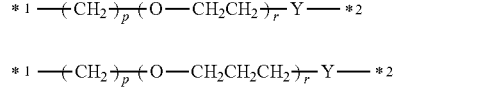

(20)

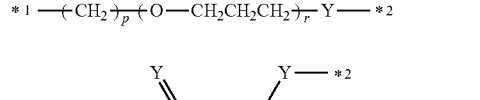

(21)

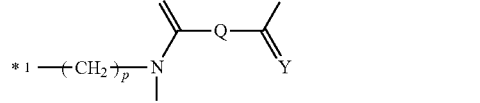

(22)

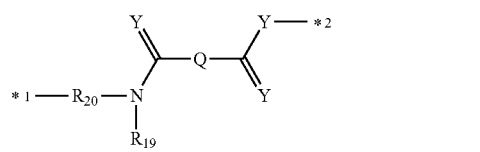

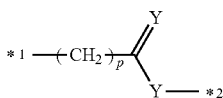

(23)

In Formulae (17) to (23),

Y represents oxygen atom and sulfur atom.

$R_{19}$ represents hydrogen and a linear or branched C1 to C10 alkyl group.

$R_{20}$ represents a linear or branched C1 to C10 alkyl group.

p represents an integer of 0 to 15, and r represents an integer of 0 to 10.

Q represents a divalent group derived from a linear or branched C1 to C10 alkylene group, a C1 to C10 alkenylene group, and a substituted aryl group at the 1,2-, 1,3-, and 1,4-position, and a divalent group derived from a substituted heteroaryl group.

*1 and *2 each represent a bonding hand, *1 is bonded to a monovalent or divalent organic group represented by "Chain", and *2 is bonded to a monovalent organic group represented by PC or PC'.

In Formula (9) or (10), "Chain" represents a monovalent or divalent organic group including at least one kind selected from a polysiloxane chain and a polyoxyalkylene chain.

Examples of the polysiloxane chain include a polydimethylsiloxane chain, a polymethylphenylsiloxane chain, and a polymethylhydrosiloxane chain.

Examples of the polyoxyalkylene chain include a polyoxyethylene chain, a polyoxypropylene chain, and a polyoxyhexamethylene chain.

Specifically, in a case where the photochromic compound is Formula (9), "Chain" represents a monovalent organic group of Formula (24) or (25).

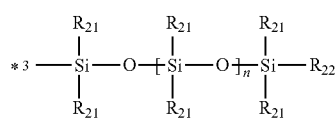

(24)

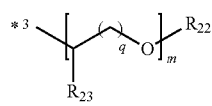

(25)

in a case where the photochromic compound is Formula (10), "Chain" represents a divalent organic group of Formula (26) or (27).

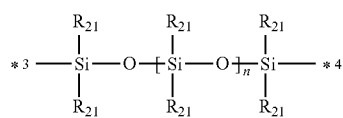

(26)

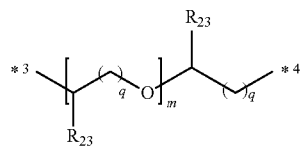

(27)

In Formulae (24) to (27), $R_{21}$ represents a linear or branched C1 to C10 alkyl group.

$R_{22}$ represents a linear or branched C1 to C10 alkyl group.

$R_{23}$ represents hydrogen, a methyl group, and an ethyl group.

n represents an integer of 4 to 75, and m represents an integer of 1 to 50.

q represents an integer of 1 to 3.

*3 and *4 each represent a bonding hand, *3 is bonded to a divalent organic group represented by L, and *4 is bonded to a divalent organic group represented by L'.

The photochromic compound of the present invention can be obtained by methods disclosed in WO2009/146509, WO2010/20770, WO2012/149599, and WO2012/162725.

Examples of the photochromic compound according to the present invention include Reversacol Humber Blue (a polydimethylsiloxane chain, naphthopyran-based chromophore (Formula 11)), Reversacol Calder Blue (a polydimethylsiloxane chain, a naphthopyran-based chromophore (Formula 11)), Reversacol Trent Blue (a polydimethylsiloxane chain, a naphthopyran-based chromophore (Formula 11)), Reversacol Pennine Green (a polydimethylsiloxane chain, a naphthopyran-based chromophore (Formula 11)), Reversacol Heath Green (a polyoxyalkylene chain, a naphthopyran-based chromophore (Formula 11)), Reversacol Chilli Red (a polydimethylsiloxane chain, a naphthopyran-based chromophore (Formula 11)), Reversacol Wembley Grey (polyoxyalkylene chain, a naphthopyran-based chromophore (Formula 11)), and Reversacol Cayenne Red (polyoxyalkylene chain, a naphthopyran-based chromophore (Formula 11)), which are manufactured by Vivimed Labs Ltd.

In the polymerizable composition according to the present invention, a combination of a predetermined polymerization initiator (B) and a predetermined photochromic compound (C) suppress the decomposition of the photochromic compound (C) due to the polymerization initiator (B). Therefore, the polymerization initiator (B) and the photochromic compound (C) can coexist in the polymerizable composition, and a cured product having excellent photochromic characteristics and having excellent hue can be obtained simply and at a low cost by the mixing method.

According to the present invention, in a case where the formulation ratio of the photochromic compound of the component (C) is too high, the photochromic compound aggregates, and thus durability rapidly decrease. Therefore, the photochromic compound (C) is generally used in the range of 0.001 to 5 pbw, preferably used in the range of 0.01 to 1 part by weight, and more preferably used in the range of 0.01 to 0.5 pbw with respect to 100 pbw of the compound (A) including two or more allyloxycarbonyl groups, and most favorable photochromic performances can be obtained in this range.

In the polymerizable composition of the present invention, various stabilizers such as a release agent, an ultraviolet absorber, an infrared absorber, an ultraviolet stabilizer, an antioxidant, a coloration inhibitor, an antistatic agent, a fluorescent dye, a dye, a pigment, and a perfume or additives may be further used in combination, if necessary.

It is suitable that the ultraviolet absorber described above is used in combination, since the durability of the photochromic compound can be further improved. As the ultraviolet absorber, a benzophenone-based ultraviolet absorber, a benzotriazole-based ultraviolet absorber, a triazine-based ultraviolet absorber, a malonic acid ester-based ultraviolet absorber, and an oxanilide-based ultraviolet absorber can be suitably used.

This ultraviolet absorber improves the durability of photochromic compounds but also inhibits the color development of the photochromic compound which is caused by ultraviolet rays. Since the absorbed ultraviolet range varies depending on the type of ultraviolet absorber, the formulation amount of the ultraviolet absorber cannot be unconditionally limited. However, the formulation amount of the ultraviolet absorber is suitably 0.001 to 5 pbw, and further 0.01 to 1 pbw with respect to 100 pbw of the radical polymerizable compound.

The polymerization process for obtaining the cured product from the polymerizable composition according to the present invention is not particularly limited, and well-known radical polymerization processs can be employed. As an example of a typical polymerization process, a cast polymerization in which the polymerizable composition of the present invention mixed with a radical polymerization initiator is injected to a portion between molds held by an adhesive tape or an elastomer gasket, or a spacer, and after being oxidized in an air furnace, the polymerizable composition is removed is employed.

The photochromic cured product obtained in the process can be subjected to the following treatment according to the use thereof. That is, it is possible to perform a treatment and a secondary treatment, such as dyeing using a dye such as a disperse dye, a hard coating agent containing a silane coupling agent or a sol such as silicon, zirconium, antimony, aluminum, tin, and tungsten as a main component, an anti-reflection treatment by vapor deposition with a thin film of metal oxides such as $SiO_2$, $TiO_2$, and $ZrO_2$, or by applying a thin film of an organic polymer, or an antistatic treatment.

Since the photochromic cured product (organic glass) obtained by polymerizing and curing the polymerizable composition of the present invention includes the radical polymerizable compound (A), the radical polymerization initiator (B), and the photochromic compound (C), the manufacturing becomes easier, excellent photochromic characteristics are exhibited, and the refractive index at a wavelength of 589.3 nm at 20° C. is set to the range of 1.49 to 1.57, and thus the photochromic cured product can be used as various optical materials. Particularly, the photochromic cured product can be suitably used as a lens or a polarized lens.

[Lens]

The lens formed of an organic glass of the present embodiment may be used by providing a coating layer on one surface or both surfaces thereof, if necessary. The lens may be preferably used as a spectacle lens.

The lens of the present embodiment includes a lens substrate and a coating layer formed of the polymerizable composition.

Specific examples of the coating layer include a primer layer, a hard coat layer, an antireflection layer, an antifog coating layer, an antifouling layer, and a water repellent layer. These coating layers may be used singly or a plurality of coating layers may be used in multilayers. In a case where coating layers are provided on the both surfaces, the same coating layer may be provided on each layer, or a different coating layer may be provided on each surface.

These coating layers may each contain an infrared absorber for the purpose of protecting eyes from infrared rays, a light stabilizer and an antioxidant for the purpose of improving the weather resistance of the lens, a photochromic compound, a dye or a pigment for the purpose of improving the fashionability of the lens, an antistatic agent, and other well-known additives in combination for enhancing the performance of the lens.

With respect to the layer to be coated by application, various leveling agents for improving applicability may be used.

The primer layer is generally formed between a hard coat layer described below and the lens. The primer layer is a coating layer intended to improve the adhesiveness between the hard coat layer formed thereon and the lens and the impact resistance can be improved in some cases. Any material can be used as the primer layer as long as the material has high adhesiveness to the obtained lens, but a primer composition including a urethane-based resin, an epoxy-based resin, a polyester-based resin, a melanin-based resin, and polyvinyl acetal as main components is generally used. For the purpose of adjusting the viscosity of the composition, a suitable solvent which does not affect the lens may be used as the primer composition. It is obvious that no solvent may be used.

The primer layer may be formed by any one of a coating method or a dry method. In the case where a coating method is used, a primer layer is formed by applying the primer composition to a lens by a well-known coating method such as spin coating and dip coating and then solidifying the primer composition. In a case where a dry method is used, a primer layer is formed by a well-known dry method such as a CVD method or a vacuum evaporation method. In a case where a primer layer is formed, for the purpose of improving adhesiveness, the surface of the lens may be subjected to pretreatments such as an alkali treatment, a plasma treatment, and an ultraviolet treatment, if necessary.

The hard coat layer is a coating layer intended to provide the lens surface with functions such as scratch resistance, wear resistance, moisture resistance, hot water resistance, heat resistance, and weather fastness.

Generally, for the hard coat layer, a hard coat composition including an organosilicon compound having curability and at least one kind of oxide fine particles of an element selected from the element group consisting of Si, Al, Sn, Sb, Ta, Ce, La, Fe, Zn, W, Zr, In, and Ti and/or at least one kind of oxide fine particles formed of a composite oxide of two or more kinds elements selected from the element group is used.

In addition to the above components, the hard coat composition preferably includes at least any one of amines, amino acids, a metal acetylacetonate complex, organic acid metal salt, perchlorates, a salt of perchloric acids, acids, metal chloride, and a polyfunctional epoxy compound. A suitable solvent that does not affect the lens may be used for the hard coat composition, or no solvent may be used.

The hard coat layer is generally formed by applying the hard coat composition by a well-known coating method such as spin coating and dip coating and curing the hard coat composition. Examples of the curing method include heat curing and a curing method by energy ray irradiation such as an ultraviolet ray or visible light. In order to suppress the generation of interference fringes, it is preferable that the difference in refractive indexes of the hard coat layer and the lens is within a range of ±0.1.

The antireflection layer is generally formed on the hard coat layer, if necessary. The antireflection layer includes an inorganic antireflection layer and an organic antireflection layer. In a case where the antireflection layer is inorganic, an inorganic oxide such as $SiO_2$ or $TiO_2$ is used, and the antireflection layer is formed by a dry method such as a vacuum deposition method, a sputtering method, an ion plating method, an ion beam assist method, and a CVD method. In a case where the antireflection layer is organic, a composition containing an organosilicon compound and silica-based fine particles having an internal cavity is used, and the antireflection layer is formed by a wet method.

The antireflection layer includes a single layer and a multiple layer. In the case where the antireflection layer is used as a single layer, it is preferable that the refractive index thereof is lower than that of the hard coat layer by at least equal to or greater than 0.1. In order to effectively exhibit an antireflection function, it is preferable to use a multilayer antireflection film. In that case, a low refractive index film and a high refractive index film are alternately laminated. In this case, a refractive index difference of the low refractive index film and the high refractive index film is preferably equal to or greater than 0.1. The high refractive index film includes a film of ZnO, $TiO_2$, $CeO_2$, $Sb_2O_5$, $SnO_2$, $ZrO_2$, $Ta_2O_5$, and the like, and the low refractive index film includes a $SiO_2$ film.

An antifog layer, an antifouling layer, and a water repellent layer may be formed on the antireflection layer, if necessary. With respect to the method of forming an antifog layer, an antifouling layer, and a water repellent layer, as long as the method does not give an adverse effect on the antireflection function, the treatment method, the treatment material, and the like are not particularly limited. Well-known antifogging treatment methods, antifouling treatment methods, water repellent treatment methods, and materials may be used. Examples of the antifogging treatment method and the antifouling treatment method include a method of covering the surface with a surfactant, a method of adding a hydrophilic film to the surface so as to cause the surface to be water absorbent, a method of covering the surface with fine irregularities so as to increase water absorption, a method of causing the surface to be water absorbent by using photocatalytic activity, and a method of preventing adhesion of water droplets by applying a super water repellent treatment. Examples of the water repellent treatment method include a method of forming a water repellent treated layer by applying a fluorine-containing silane compound and the like by vapor deposition or sputtering and a method of dissolving a fluorine-containing silane compound in a solvent and performing coating to form a water repellent treated layer.

[Polarized Lens]

The polarized lens according to the present embodiment includes a polarizing film and a substrate layer which is formed on at least one surface of the polarizing film and which is formed of an organic glass.

The polarizing film according to the present embodiment may be formed of a thermoplastic resin. Examples of the thermoplastic resin include thermoplastic polyester, thermoplastic polycarbonate, thermoplastic polyolefin, and thermoplastic polyimide. In view of water resistance, heat resistance, and form workability, thermoplastic polyester and thermoplastic polycarbonate are preferable, and thermoplastic polyester is more preferable.

Examples of the thermoplastic polyester include polyethylene terephthalate, polyethylene naphthalate, and polybutylene terephthalate. In view of water resistance, heat resistance, and form workability, polyethylene terephthalate is more preferable.

Specific examples of the polarizing film include a thermoplastic polyester polarizing film containing a dichroic dye, a polyvinyl alcohol polarizing film containing iodine, and a polyvinyl alcohol polarizing film containing a dichroic dye.

The polarizing film may be used after a drying treatment and a heating treatment for drying and stabilizing thereof.

In order to improve the adhesiveness to the acrylic resin, the polarizing film may be used after one kind or two or more kinds of pretreatments selected from a primer coating treatment, a chemical treatment (a chemical treatment such as gas or alkali), a corona discharge treatment, a plasma treatment, an ultraviolet ray irradiation treatment, an electron beam irradiation treatment, a surface roughening treatment, a flame treatment, and the like may be performed. Among such pretreatments, one kind or two or more kinds selected from a primer coating treatment, a chemical treatment, a corona discharge treatment, and a plasma treatment are particularly preferable.

The polarized lens of the present embodiment can be obtained by providing a substrate layer comprised of an organic glass obtained by curing the polymerizable composition of the present embodiment, on at least one surface of the polarizing film.

The process for producing the plastic polarized lens is not particularly limited. However, preferable examples thereof include a cast polymerization process.

For example, the process for producing the plastic polarized lens of the present embodiment may include a step of fixing a polarizing film to a lens casting mold in a state of being separated from molds;

a step of injecting a polymerizable composition to at least one of cavities formed between the polarizing film and the molds; and a step of polymerizing and curing the polymerizable composition and laminating a substrate layer on at least one surface of the polarizing film.

The lens casting mold generally is constituted of two substantially disc-shaped glass molds held by a gasket. The polarizing film is mounted in the cavity of this lens casting mold so as to be parallel to the inner surface of the mold on the front side where the film surface faces. Cavities are formed between the polarizing film and the mold. The polarizing film may be shaped in advance.

The polymerization condition of the polymerizable composition differs depending on the composition of the polymerizable composition, the types and the use amount of the catalyst, and the shape of the mold, but the polymerization is performed at the temperature of 5° C. to 140° C. for 1 to 50 hours. In some cases, it is preferable that the temperature is maintained or is gradually increased in a temperature range of 5° C. to 130° C., and the polymerizable composition is cured for 1 to 25 hours.

The laminate cured by polymerization is released from the casting mold, so as to obtain a polarized lens of the present embodiment.

According to the present embodiment, the laminate after polymerization and release may be subjected to a heating treatment such as annealing. With respect to the treatment temperature, in view of the effects of the present invention, the treatment is performed at 90° C. to 150° C., is preferably performed at 110° C. to 130° C. and more preferably performed at 115° C. to 125° C. In view of the effect of the present invention, the treatment time is in the range of 1 to 10 hours and preferably 2 to 5 hours.

The coating layer which is the same as that of the lens may be formed on the surface of the obtained substrate layer.

EXAMPLES

Hereinafter, the present invention is described with reference to examples and comparative examples, but the present invention is not limited to these examples.

Examples 1 to 9 and Comparative Examples 1 to 6

The radical polymerizable compound (A), the photochromic compound (C), and other additive components presented in Examples 1 to 9 and Comparative Examples 1 to 6 of Table 1 were sufficiently mixed at 70° C. The mixed solution was cooled to the room temperature, the radical polymerization initiator (B) was added, and mixing was performed at room temperature until the mixed solution becomes homogeneous. These formulation ratios were presented in Table 1.

The mixed solution containing the photochromic compound was injected into a form in which the outer peripheries of two disk-shaped glass plates were wrapped with an adhesive tape, so as to perform cast polymerization. Polymerization was performed by gradually raising the temperature using an air furnace. After the polymerization was completed, the mold was extracted from the air furnace, and the casting mold was left to be cooled, the cured product was removed from the glass form of the casting mold.

The resin yellowness and photochromic characteristics of the obtained photochromic cured product were tested by the following method. Results thereof are presented in Table 2.

(2) Resin Yellowness (YI)

YI of the obtained photochromic cured product (thickness: 2 mm) was measured by using a spectrophotometer CM-5 manufactured by Konica Minolta, Inc.

(3) Photochromic Characteristics

Light transmittance at 550 nm after color development: Spectroscopy in a case where the color of the obtained photochromic cured product (thickness 2 mm) was developed for 5 minutes at a temperature of 23° C. by using an MC-2563 xenon lamp (180 W) light source device (illuminance 50,000 lx) manufactured by Otsuka Electronics Co., Ltd. was measured with a MCPD-7700 transmission measurement system.

Photochromic performances were evaluated by transmittance before the color development, transmittance after the color development, and a transmittance change amount before and after the color development.

The maximum absorption wavelength (Amax) in color development varies depending on the photochromic compound, and thus the photochromic performances were evaluated by the transmittance at Amax.

It is indicated that, the lower the transmittance after color development, the higher the light shielding properties during color development, and the larger the transmittance change amount before and after color development, the higher the difference in density before and after color development, and the higher the photochromic performance.

(4) The refractive index of a cured product in a wavelength of 589.3 nm at 20° C. was measured with an Abbe refractometer manufactured by Atago Co., Ltd. All the cured products of Examples 1 to 7 and Comparative Examples 1 to 6 each had a refractive index of 1.500±0.002, and the cured products of Examples 8 and 9 had a refractive index of 1.550±0.002.

(Raw Material Used)
Polymerizable Compound
RAV 7MC (poly(allyl carbonate) compound of diethylene glycol, neopentyl glycol, and pentaerythritol, and an oligomer thereof, manufactured by ACOMON AG)
RAV 7AT (poly(allyl carbonate) compound of diethylene glycol and pentaerythritol, and oligomer thereof, manufactured by ACOMON AG)
RAV 7NG (poly(allyl carbonate) compound of diethylene glycol and pentaerythritol, and oligomer thereof, manufactured by ACOMON AG)
RAV 755T (a mixture of an allyl ester compound, an allyl carbonate compound, and a compound having an allyl ester group and an allyl carbonate group, obtained by transesterification of dimethyl terephthalate, allyl alcohol, diallyl carbonate, and diethylene glycol, manufactured by ACOMON AG)
Radical Polymerization Initiator
LUPEROX TAEC (OO-(t-amyl)-O-(2-ethylhexyl) monoperoxycarbonate, manufactured by Arkema)
PERHEXA HC (1,1-bis(t-hexylperoxy) cyclohexane, manufactured by NOF Corporation)
LUPEROX 570 (t-amylperoxyisononanote, manufactured by Arkema Yoshitomi Co., Ltd.)
TRIGONOX ADC-NS 30 (a diethylene glycol bis(allyl carbonate) solution containing 30 pbw of isopropyl isobutyl peroxydicarbonate, diisopropyl peroxydicarbonate, and diisobutyl peroxydicarbonate in sum, manufactured by Akzo Nobel N.V.)
Photochromic Compound
Reversacol Heath Green (a polyoxyalkylene chain, a naphthopyran-based chromophore (Formula 11))
Reversacol Wembley Grey (a polyoxyalkylene chain, a naphthopyran-based chromophore (Formula 11))
Reversacol Pennie Green (a polydimethylsiloxane chain, a naphthopyran-based chromophore (Formula 11))
Reversacol Humber Blue (a polydimethylsiloxane chain, a naphthopyran-based chromophore (Formula 11))

Example 1

0.035 pbw of a photochromic compound Reversacol Heath Green (trade name, manufactured by Vivimed Labs Ltd.), 0.065 pbw of Reversacol Wembley Grey (trade name, manufactured by Vivimed Labs Ltd.), and 0.15 pbw of 2-hydroxy-4-methoxybenzophenone (trade name, SEESORB 101, manufactured by Shipro Kasei Kaisha, Ltd.) were dissolved at 70° C. with respect to 99.1 pbw of RAV 7NG (manufactured by ACOMON AG) of commercially available poly(allyl carbonate), cooling was performed to room temperature, 0.9 pbw of LUPEROX TAEC (trade name, manufactured by Arkema) was added as a curing agent, injection was performed into a form obtained by wrapping the outer peripheries of two disc-shaped glass plates with an adhesive tape, and polymerization was performed for 24 hours by gradually raising the temperature from room temperature to 110° C. Thereafter, the molded product was released and was post-polymerized by being heated at 120° C. for one hour to obtain a flat sheet having a thickness of 2 mm. The YI of the obtained resin was 4.1 and was pale yellow. The transmittance after color development at Amax was 29.6%, and the transmittance change amount before and after color development was 58.4%.

Example 2

0.035 pbw of a photochromic compound Reversacol Heath Green (trade name, manufactured by Vivimed Labs Ltd.), 0.065 pbw of Reversacol Wembley Grey (trade name, manufactured by Vivimed Labs Ltd.), 0.15 pbw of 2-hydroxy-4-methoxybenzophenone (trade name: SEESORB 101, manufactured by Shipro Kasei Kaisha, Ltd.), 2.5 ppm of 1,4-bis[(2,6-diethyl-4-methylphenyl)amino]-9,10-anthraquinone (trade name: Macrolex Blue RR, manufactured by LANXESS AG), and 2.5 ppm of 1,4-diamino-2,3-phenoxy- 9,10-anthraquinone (trade name: Solvaperm Red Violet R, manufactured by Clariant) were dissolved at 70° C. with respect to 99.1 pbw of commercially available poly(allyl carbonate) RAV 7NG (manufactured by ACOMON AG), cooling was performed to room temperature, 0.9 pbw of LUPEROX TAEC (trade name, manufactured by Arkema) was added as a curing agent, injection was performed into a form obtained by wrapping the outer peripheries of two disc-shaped glass plates with an adhesive tape, and polymerization was performed for 24 hours by gradually raising the temperature from room temperature to 110° C. Thereafter, the molded product was released and was post-polymerized by being heated at 120° C. for one hour to obtain a flat sheet having a thickness of 2 mm. The YI of the obtained resin was 1.7 and was a neutral color. The transmittance after color development at Amax was 29.3%, and the transmittance change amount before and after color development was 57.4%.

Example 3

0.035 pbw of a photochromic compound Reversacol Heath Green (trade name, manufactured by Vivimed Labs Ltd.), 0.065 pbw of Reversacol Wembley Grey (trade name, manufactured by Vivimed Labs Ltd.), and 0.15 pbw of 2-hydroxy-4-methoxybenzophenone (trade name, SEESORB 101, manufactured by Shipro Kasei Kaisha, Ltd.) were dissolved at 70° C. with respect to 98.8 pbw of RAV 7NG (manufactured by ACOMON AG) of commercially available poly(allyl carbonate), cooling was performed to room temperature, 1.2 pbw of PERHEXAHC (trade name, manufactured by NOF Corporation) was added as a curing agent, injection was performed into a form obtained by wrapping the outer peripheries of two disc-shaped glass plates with an adhesive tape, and polymerization was performed for 24 hours by gradually raising the temperature from room temperature to 100° C. Thereafter, the molded product was released and was post-polymerized by being heated at 110° C. for one hour to obtain a flat sheet having a thickness of 2 mm. The YI of the obtained resin was 4.8 and was pale yellow. The transmittance after color development at Amax was 30.1%, and the transmittance change amount before and after color development was 56.7%.

Example 4

0.03 pbw of a photochromic compound Reversacol Heath Green (trade name, manufactured by Vivimed Labs Ltd.) and 0.06 pbw of Reversacol Wembley Grey (trade name, manufactured by Vivimed Labs Ltd.) were dissolved at 70° C. with respect to 98.8 pbw of RAV 7NG (manufactured by ACOMON AG) of commercially available poly(allyl carbonate), cooling was performed to room temperature, and 1.2 pbw of LUPEROX 570 (trade name, manufactured by ARKEMA Yoshitomi, Ltd.) was added as a curing agent, injection was performed into a form obtained by wrapping the outer peripheries of two disc-shaped glass plates with an adhesive tape, and polymerization was performed for 24 hours by gradually raising the temperature from room temperature to 110° C. Thereafter, the molded product was released and was post-polymerized by being heated at 120° C. for one hour to obtain a flat sheet having a thickness of 2 mm. The YI of the obtained resin was 3.8 and was pale yellow. The transmittance after color development at Amax was 27.8%, and the transmittance change amount before and after color development was 59.6%.

Example 5

0.03 pbw of a photochromic compound Reversacol Heath Green (trade name, manufactured by Vivimed Labs Ltd.), 0.06 pbw of Reversacol Wembley Grey (trade name, manufactured by Vivimed Labs Ltd.), and 0.2 pbw of 2-hydroxy-4-methoxybenzophenone (trade name, SEESORB 101, manufactured by Shipro Kasei Kaisha, Ltd.) were dissolved at 70° C. with respect to a mixture of 69.4 pbw of RAV 7AT (manufactured by ACOMON AG) of commercially available poly(allyl carbonate) and 29.7 pbw of RAV 7MC (manufactured by ACOMON AG) of commercially available poly(allyl carbonate), cooling was performed to room temperature, 0.9 pbw of LUPEROX TAEC (trade name, manufactured by Arkema) was added as a curing agent, injection was performed into a form obtained by wrapping the outer peripheries of two disc-shaped glass plates with an adhesive tape, and polymerization was performed for 24 hours by gradually raising the temperature from room temperature to 120° C. Thereafter, the molded product was released and was post-polymerized by being heated at 120° C. for one hour to obtain a flat sheet having a thickness of 2 mm. The YI of the obtained resin was 4.0 and was pale yellow. The transmittance after color development at Amax was 33.7%, and the transmittance change amount before and after color development was 53.2%.

Example 6

0.046 pbw of a photochromic compound Reversacol Pennine Green (trade name, manufactured by Vivimed Labs Ltd.) was dissolved at 70° C. with respect to 99.2 pbw of RAV 7MC (manufactured by ACOMON AG) of commercially available poly(allyl carbonate), cooling was performed to room temperature, and 0.8 pbw of LUPEROX TAEC (trade name, manufactured by ARKEMA) was added as a curing agent, injection was performed into a form obtained by wrapping the outer peripheries of two disc-shaped glass plates with an adhesive tape, and polymerization was performed for 24 hours by gradually raising the temperature from room temperature to 120° C. Thereafter, the molded product was released and was post-polymerized by being heated at 120° C. for one hour to obtain a flat sheet having a thickness of 2 mm. The YI of the obtained resin was 3.7 and was pale yellow. The transmittance after color development at Amax was 45.4%, and the transmittance change amount before and after color development was 44.1%.

Example 7

A flat sheet having a thickness of 2 mm was obtained in the same manner as in Example 6 except for using Reversacol Humber Blue (trade name, manufactured by Vivimed Labs Ltd.) instead of Reversacol Pennine Green (trade name, manufactured by Vivimed Labs Ltd.) as the photochromic compound. The YI of the obtained resin was 2.6 and was pale yellow. The transmittance after color development at Amax was 66.3%, and the transmittance change amount before and after color development was 24.5%.

Example 8

0.046 pbw of a photochromic compound Reversacol Pennine Green (trade name, manufactured by Vivimed Labs Ltd.) was dissolved at 70° C. with respect to 99.2 pbw of RAV 755T (manufactured by ACOMON AG) of a commercially available mixture of poly(allyl ester) and poly(allyl carbonate), cooling was performed to room temperature, and 0.8 pbw of LUPEROX TAEC (trade name, manufactured by ARKEMA) was added as a curing agent, injection was performed into a form obtained by wrapping the outer peripheries of two disc-shaped glass plates with an adhesive tape, and polymerization was performed for 24 hours by gradually raising the temperature from room temperature to 120° C. Thereafter, the molded product was released and was post-polymerized by being heated at 120° C. for one hour to obtain a flat sheet having a thickness of 2 mm. The YI of the obtained resin was 2.8 and was pale yellow. The transmittance after color development at λmax was 35.5%, and the transmittance change amount before and after color development was 52.4%.

Example 9

A flat sheet having a thickness of 2 mm was obtained in the same manner as in Example 8 except for using Reversacol Humber Blue (trade name, manufactured by Vivimed Labs Ltd.) instead of Reversacol Pennine Green (trade name, manufactured by Vivimed Labs Ltd.) as the photochromic compound. The YI of the obtained resin was 3.2 and was pale yellow. The transmittance after color development at λmax was 63.0%, and the transmittance change amount before and after color development was 26.4%.

Comparative Example 1

0.046 pbw of a photochromic compound Reversacol Pennine Green (trade name, manufactured by Vivimed Labs Ltd.) was dissolved at 70° C. with respect to 90 pbw of RAV 7MC (manufactured by ACOMON AG) (manufactured by ACOMON AG) of commercially available poly(allyl carbonate), cooling was performed to room temperature, and 10 pbw of TRIGONOX ADC-NS30 (trade name, manufactured by Akzo Nobel N.V.) was added as a curing agent, injection was performed into a form obtained by wrapping the outer peripheries of two disc-shaped glass plates with an adhesive tape, polymerization was performed for 20 hours by gradually raising the temperature from room temperature to 80° C. The molded product was released and was post-polymerized by being heated for two hours at 110° C. to obtain a flat sheet having a thickness of 2 mm. The YI of the obtained resin was 13.7 and was dark yellow. The transmittance after color development at λmax was 77.4%, and the transmittance change amount before and after color development was 1.0%.

Comparative Example 2

A flat sheet having a thickness of 2 mm was obtained in the same manner as in Comparative Example 1 except for using Reversacol Humber Blue (trade name, manufactured by Vivimed Labs Ltd.) instead of Reversacol Pennine Green (trade name, manufactured by Vivimed Labs Ltd.) as the photochromic compound. The YI of the obtained resin was 7.6 and was yellow. The transmittance after color development at λmax was 87.6%, and the transmittance change amount before and after color development was 3.7%.

Comparative Example 3

0.046 pbw of a photochromic compound CR49 (manufactured by Corning Incorporated) was dissolved at 70° C. with respect to 99.2 pbw of RAV 7MC (manufactured by ACOMON AG) of commercially available poly(allyl carbonate), cooling was performed to room temperature, and 0.8 pbw of LUPEROX TAEC (trade name, manufactured by ARKEMA) was added as a curing agent, injection was performed into a form obtained by wrapping the outer peripheries of two disc-shaped glass plates with an adhesive tape, and polymerization was performed for 24 hours by gradually raising the temperature from room temperature to 110° C. Thereafter, the molded product was released and was post-polymerized by being heated at 120° C. for one hour to obtain a flat sheet having a thickness of 2 mm. The YI of the obtained resin was 36.3 and was yellowish brown. The transmittance after color development at λmax was 62.7%, and the transmittance change amount before and after color development was 22.5%.

Comparative Example 4

A flat sheet having a thickness of 2 mm was obtained in the same manner as in Comparative Example 3 except for using CR59 (manufactured by Corning Incorporated) instead of CR49 (manufactured by Corning Incorporated) as the photochromic compound. The YI of the obtained resin was 16.6 and was dark yellow. The transmittance after color development at λmax was 29.3%, and the transmittance change amount before and after color development was 47.2%.

Comparative Example 5

A flat sheet having a thickness of 2 mm was obtained in the same manner as in Comparative Example 3 except for using CR173 (manufactured by Corning Incorporated) instead of CR49 (manufactured by Corning Incorporated) as the photochromic compound. The YI of the obtained resin was 8.1 and was yellow. The transmittance after color development at λmax was 74.9%, and the transmittance change amount before and after color development was 16.9%.

Comparative Example 6

A flat sheet having a thickness of 2 mm was obtained in the same manner as in Comparative Example 3 except for using CR209 (manufactured by Corning Incorporated) instead of CR49 (manufactured by Corning Incorporated) as the photochromic compound. The YI of the obtained resin was 10.4 and was yellow. The transmittance after color development at λmax was 52.0%, and the transmittance change amount before and after color development was 22.9%.

TABLE 1

|  | Polymerizable monomer | Photochromic dye Type | Photochromic dye Use amount (ppm) | Radical polymerization initiator Type | Radical polymerization initiator Use amount (pbw) | Ultraviolet absorber Seesorb 101 (ppm) | Blueing agent Blue dye (ppm) | Blueing agent Violet dye (ppm) |
|---|---|---|---|---|---|---|---|---|
| Example 1 | RAV 7NG | Reversacol Heath Green / Reversacol Wembley Grey | 350 / 650 | LUPEROX TAEC | 0.9 | 1500 | 0 | 0 |
| Example 2 | RAV 7NG | Reversacol Heath Green / Reversacol Wembley Grey | 350 / 650 | LUPEROX TAEC | 0.9 | 1500 | 2.5 | 2.5 |
| Example 3 | RAV 7NG | Reversacol Heath Green / Reversacol Wembley Grey | 350 / 650 | PERHEXA HC | 1.2 | 1500 | 0 | 0 |
| Example 4 | RAV 7NG | Reversacol Heath Green / Reversacol Wembley Grey | 300 / 600 | LUPEROX 570 | 1.2 | 0 | 0 | 0 |
| Example 5 | RAV 7AT/RAV 7MC(70/30) | Reversacol Heath Green / Reversacol Wembley Grey | 300 / 600 | LUPEROX TAEC | 0.9 | 2000 | 0 | 0 |
| Example 6 | RAV 7MC | Reversacol Pennine Green | 460 | LUPEROX TAEC | 0.8 | 0 | 0 | 0 |
| Example 7 | RAV 7MC | Reversacol Humber Blue | 460 | LUPEROX TAEC | 0.8 | 0 | 0 | 0 |
| Example 8 | RAV 755T | Reversacol Pennine Green | 460 | LUPEROX TAEC | 0.8 | 0 | 0 | 0 |
| Example 9 | RAV 755T | Reversacol Humber Blue | 460 | LUPEROX TAEC | 0.8 | 0 | 0 | 0 |
| Comparative Example 1 | RAV 7MC | Reversacol Pennine Green | 500 | ADC 30 | 10 | 0 | 0 | 0 |
| Comparative Example 2 | RAV 7MC | Reversacol Humber Blue | 500 | ADC 30 | 10 | 0 | 0 | 0 |
| Comparative Example 3 | RAV 7MC | CR49 | 460 | LUPEROX TAEC | 0.8 | 0 | 0 | 0 |
| Comparative Example 4 | RAV 7MC | CR59 | 460 | LUPEROX TAEC | 0.8 | 0 | 0 | 0 |
| Comparative Example 5 | RAV 7MC | CR173 | 460 | LUPEROX TAEC | 0.8 | 0 | 0 | 0 |
| Comparative Example 6 | RAV 7MC | CR209 | 460 | LUPEROX TAEC | 0.8 | 0 | 0 | 0 |

TABLE 2

|  | Photochromic characteristics | | | |
|---|---|---|---|---|
|  | Resin hue YI | Maximum absorption wavelength λmax [nm] | Transmittance before color development [% T] | Transmittance after color development [% T] | Transmittance change amount before and after color development [% T] |
|---|---|---|---|---|---|
| Example 1 | 4.1 | 445 | 88.0 | 29.6 | 58.4 |
| Example 2 | 1.7 | 445 | 86.7 | 29.3 | 57.4 |
| Example 3 | 4.8 | 445 | 86.8 | 30.1 | 56.7 |
| Example 4 | 3.8 | 445 | 87.4 | 27.8 | 59.6 |
| Example 5 | 4.0 | 445 | 86.9 | 33.7 | 53.2 |
| Example 6 | 3.7 | 450 | 89.5 | 45.4 | 44.1 |
| Example 7 | 2.6 | 570 | 90.8 | 66.3 | 24.5 |
| Example 8 | 2.8 | 450 | 87.9 | 35.5 | 52.4 |
| Example 9 | 3.2 | 570 | 89.4 | 63.0 | 26.4 |
| Comparative Example 1 | 13.7 | 450 | 78.4 | 77.4 | 1.0 |
| Comparative Example 2 | 7.6 | 570 | 91.3 | 87.6 | 3.7 |
| Comparative Example 3 | 36.3 | 545 | 85.2 | 62.7 | 22.5 |
| Comparative Example 4 | 16.6 | 450 | 76.5 | 29.3 | 47.2 |
| Comparative Example 5 | 8.1 | 575 | 91.8 | 74.9 | 16.9 |
| Comparative Example 6 | 10.4 | 415 | 74.9 | 52.0 | 22.9 |

It is assumed that the same result would be obtained with the polarized lens.

This application claims priority based on Japanese Patent Application No. 2015-183493 filed on Sep. 16, 2015, and priority based on Japanese Patent Application No. 2015-240356 filed on Dec. 9, 2015, and all of the disclosures thereof are incorporated hereto.

The invention claimed is:

1. A polymerizable composition comprising:
   a compound (A) including two or more allyloxycarbonyl groups represented by Formula (1);
   a polymerization initiator (B) which is at least one kind selected from the group consisting of a peroxyketal-based radical polymerization initiator, a peroxy monocarbonate-based radical polymerization initiator, and a peroxyester-based radical polymerization initiator; and
   a photochromic compound (C) which is at least one kind selected from a naphthopyran compound group,

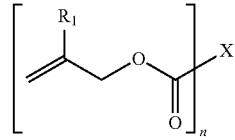

(1)

wherein, in the formula, n is an integer of 2 to 6, $R_1$ represents a hydrogen atom or a methyl group, and a plurality of $R_1$'s existing together may be identical to or different from each other, and X is a divalent to hexavalent organic group a derived from a linear or branched aliphatic polyol having 3 to 12 carbon atoms which optionally have an oxygen atom, a divalent to hexavalent organic group b derived from a cyclic aliphatic polyol having 5 to 16 carbon atoms which optionally have an oxygen atom, or a divalent to hexavalent organic group c derived from an aromatic compound having 6 to 12 carbon atoms, and the organic group a or the organic group b is bonded to an allyloxycarbonyl group via an ether group derived from a hydroxyl group included in these organic groups, so as to form an allyl carbonate group.

2. The polymerizable composition according to claim 1, wherein, the compound (A) including two or more allyloxycarbonyl groups comprises an allyl carbonate polymerizable compound represented by Formula (2) and an oligomer thereof, an allyl ester polymerizable compound represented by Formula (3) or (4) and an oligomer thereof, or a polymerizable compound including at least one of an allyl ester group and an allyl carbonate group represented by Formula (5) and an oligomer thereof,

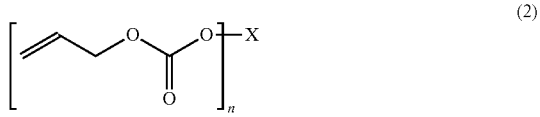
(2)

wherein, in Formula (2), X represents a divalent to hexavalent group derived from a linear or branched C3 to C12 aliphatic polyol or a divalent to hexavalent group derived from a C5 to C16 cyclic aliphatic polyol, and n represents an integer of 2 to 6,

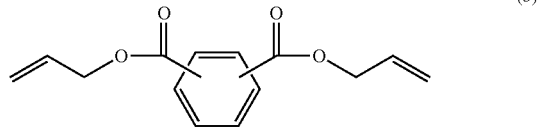
(3)

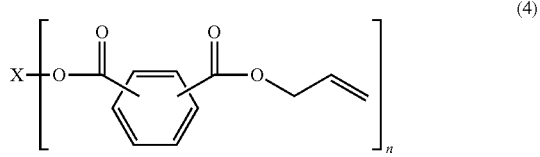
(4)

wherein, in Formula (4), X represents a divalent group derived from a linear or branched C2 to C8 aliphatic diol or a trivalent to hexavalent group derived from a linear or branched C3 to C10 aliphatic polyol having three to six hydroxyl groups, and n represents an integer of 2 to 6,

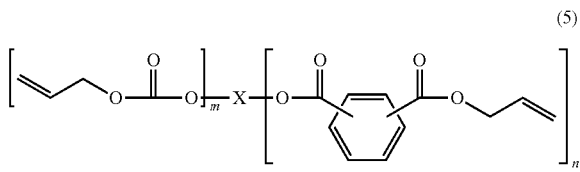
(5)

wherein, in Formula (5), X represents a divalent group derived from a linear or branched C2 to C8 aliphatic diol or a trivalent to hexavalent group derived from a linear or branched C3 to C10 aliphatic polyol having three to six hydroxyl groups, m and n each represent an integer of 0 to 6, and a sum of m and n is an integer of 2 to 6.

3. The polymerizable composition according to claim 1 or 2, wherein the polymerization initiator (B) is at least one kind selected from the group consisting of a peroxyketal-based polymerization initiator represented by Formula (6) having a 10-hour half-life temperature of 80° C. or more, a peroxy monocarbonate-based polymerization initiator represented by Formula (7) having a 10-hour half-life temperature of 80° C. or more, and a peroxyester-based polymerization initiator represented by Formula (8) having a 10-hour half-life temperature of 65° C. or more,

(6)

wherein, in Formula (6), $R_3$ is a tertiary alkyl group, $R_1$ and $R_2$ each independently represent an alkyl group selected from methyl, ethyl, propyl, and butyl, the alkyl group may have an alkyl ester group at a terminal thereof, or $R_1$ and $R_2$ may form a cycloalkylene group together with a carbon atom to which $R_1$ and $R_2$ are bonded, and the cycloalkylene group may have one to three alkyl substituents,

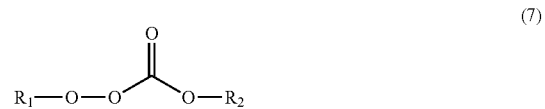
(7)

wherein, in Formula (7), $R_1$ represents a C3 to C6 tertiary alkyl group, and $R_2$ represents a linear or branched C3 to C8 alkyl group,

(8)

wherein, in Formula (8), $R_1$ represents a C3 to C6 tertiary alkyl group, and $R_2$ represents a linear or branched C3 to C9 alkyl group or a phenyl group.

4. The polymerizable composition according to claim 1, wherein the photochromic compound (C) is at least one kind selected from Formula (9) or (10), PC-L-Chain (9)

PC-L-Chain-L'-PC' (10)

wherein, in Formula (9) or (10), PC and PC' each represent a monovalent group derived from compounds of Formulae (11) to (14), and PC and PC' may be identical to or different from each other,

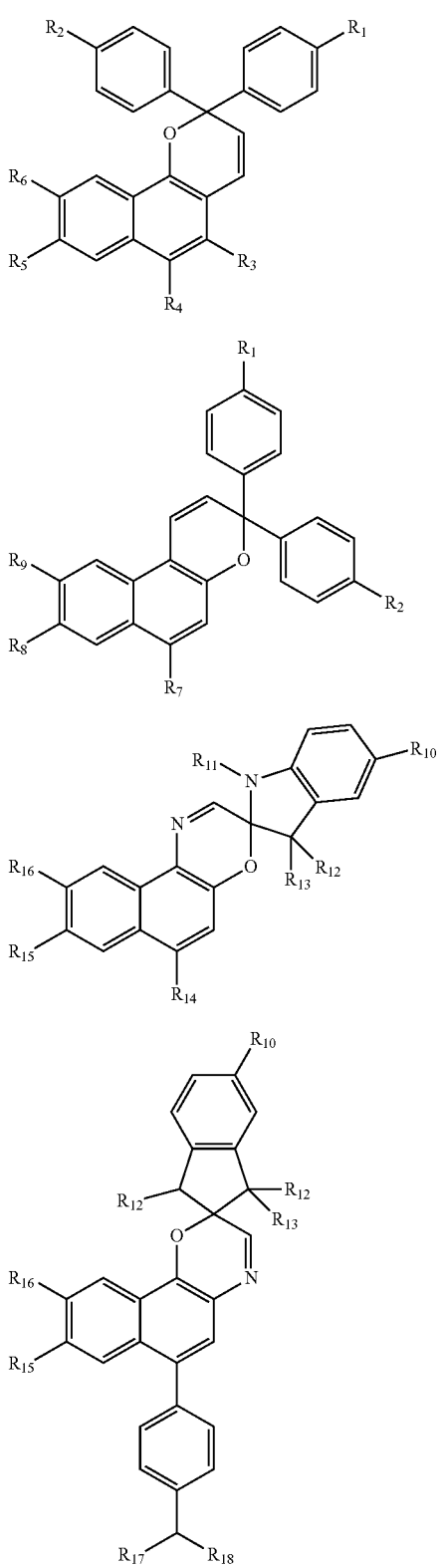

(11)
(12)
(13)
(14)

wherein, in Formulae (11) to (14), $R_1$ to $R_{18}$ represent hydrogen, a halogen atom, a carboxyl group, an acetyl group, a formyl group, an optionally substituted C1 to C20 aliphatic group, an optionally substituted C3 to C20 alicyclic group, and an optionally substituted C6 to C20 aromatic organic group, and may be identical to or different from each other, the aliphatic group, the alicyclic group, or the aromatic organic group may contain an oxygen atom or a nitrogen atom, any one group included in the compounds represented by Formulae (11) to (14) is bonded to L or L' which is a divalent organic group, in Formula (9) or (10), L and L' each represent a divalent organic group including at least one kind selected from an oxyethylene chain, an oxypropylene chain, a (thio) ester group, and a (thio)amide group, and in Formula (9) or (10), Chain represents a monovalent or divalent organic group including at least one kind selected from a polysiloxane chain and a polyoxyalkylene chain.

5. The composition according to claim 2,
wherein the allyl carbonate polymerizable compound comprises at least one kind selected from:
a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane;
a tris(allyl carbonate) compound of at least one kind of triol selected from glycerol, trimethylolpropane, and tris(hydroxyethyl) isocyanurate;
a tetra(allyl carbonate) compound of at least one kind of tetraol selected from pentaerythritol, diglycerol, and ditrimethylolpropane;
a hexa(allyl carbonate) compound of dipentaerythritol; and
a mixed poly(allyl carbonate) compound of at least two kinds selected from the diol compound, the triol compound, the tetraol compound, and the dipentaerythritol compound.

6. The composition according to claim 2,
wherein the allyl carbonate polymerizable compound comprises at least one kind selected from:
(i) a mixture of a diethylene glycol bis(allyl carbonate) compound and an oligomer thereof;
(ii) a mixture of a bis(allyl carbonate) compound of a mixture of diethylene glycol and neopentyl glycol and an oligomer thereof;
(iii) a mixture of a poly(allyl carbonate) compound of a mixture of diethylene glycol and tris(hydroxyethyl) isocyanurate and an oligomer thereof;
(iv) a mixture of a poly(allyl carbonate) compound of a mixture of diethylene glycol and trimethylolpropane and an oligomer thereof;
(v) a mixture of a poly(allyl carbonate) compound of a mixture of diethylene glycol and pentaerythritol and an oligomer thereof;
(vi) a mixture of a poly(allyl carbonate) compound of a mixture of diethylene glycol, neopentyl glycol, and pentaerythritol and an oligomer thereof; and
(vii) a poly(allyl carbonate) mixture comprising a mixture of a poly(allyl carbonate) compound of a mixture of diethylene glycol, neopentyl glycol, and pentaerythritol and an oligomer thereof and a mixture of a diethylene glycol bis(allyl carbonate) compound and an oligomer thereof.

7. The composition according to claim 2,
wherein the allyl ester polymerizable compound comprises at least one kind selected from:
a diallyl phthalate monomer selected from diallyl isophthalate, diallyl terephthalate, and diallyl orthophthalate;
a diallyl ester monomer obtained by transesterification reaction of the diallyl phthalate monomer and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof;
a polyallyl ester monomer obtained by transesterification reaction of the diallyl phthalate monomer and a mixture of at least one kind of polyol selected from glycerol, trimethylolpropane, tris(hydroxyethyl) isocyanurate, pentaerythritol, diglycerol, ditrimethylolpropane, and dipentaerythritol, and an oligomer thereof; and
an allyl ester monomer including an allyl carbonate group, obtained by transesterification reaction of at least one kind of dialkyl phthalate selected from dialkyl isophthalate having a C1 to C3 alkyl group, dialkyl terephthalate, and dialkyl orthophthalate, allyl alcohol, diallyl carbonate, and a mixture of the diol or the polyol, and an oligomer thereof.

8. The polymerizable composition according to claim 2,
wherein the allyl ester polymerizable compound comprises at least one kind selected from:
(i) a mixture of diallyl terephthalate, and 30 wt % of a diethylene glycol bis(allyl carbonate) compound and an oligomer thereof with respect to the diallyl terephthalate;
(ii) an allyl ester compound obtained by transesterification reaction of a mixture of diallyl terephthalate and propylene glycol;
(iii) a mixture of the allyl ester compound of (ii), and 20 wt % of a diethylene glycol bis(allyl carbonate) compound and an oligomer thereof with respect to the allyl ester compound;
(iv) a mixture of an allyl ester compound, an allyl carbonate compound, and a compound having an allyl ester group, and an allyl carbonate group, obtained by transesterification reaction of a mixture of dimethyl terephthalate, allyl alcohol, diallyl carbonate, and diethylene glycol; and
(v) a mixture of the mixture obtained in (iv), 10 wt % of a diethylene glycol bis(allyl carbonate) compound and the oligomer thereof with respect to the mixture.

9. The composition according to claim 2,
wherein the compound (A) comprising two or more allyloxycarbonyl groups is
a mixture of the allyl ester polymerizable compound according to claim 7 and an oligomer thereof and the allyl carbonate polymerizable compound according to claim 5 and an oligomer thereof.

10. The composition according to claim 1,
wherein a content of the component (B) is 0.3 to 5.0 pbw with respect to 100 pbw of the component (A).

11. The composition according to claim 1,
wherein a content of the component (C) is 0.01 to 0.5 pbw with respect to 100 pbw of the component (A).

12. A process for producing an organic glass having a photochromic performance, comprising:
a step of performing radical polymerization on the polymerizable composition according to claim 1.

13. The process according to claim 12,
wherein the step comprises a cast polymerization step of injecting the polymerizable composition into a casting mold and polymerizing the polymerizable composition at a temperature in a range of 50° C. to 120° C. for 1 to 100 hours.

14. An organic glass obtained by polymerizing and curing the polymerizable composition according to claim 1.

15. A lens comprised of the organic glass according to claim 14.

16. A polarized lens comprising:
a polarizing film; and
a substrate layer comprised of the organic glass according to claim 14 formed on at least one surface of the polarizing film.

* * * * *